United States Patent
Schile

(10) Patent No.: US 6,987,161 B2
(45) Date of Patent: Jan. 17, 2006

(54) EPOXY HARDENERS FOR LOW TEMPERATURE CURING

(75) Inventor: Richard D. Schile, Ridgefield, CT (US)

(73) Assignee: Ardes Enterprise, Inc., Ridgefield, CT (US)

(*) Notice: Subject to any disclaimer, the term of this patent is extended or adjusted under 35 U.S.C. 154(b) by 202 days.

(21) Appl. No.: 10/423,699

(22) Filed: Apr. 25, 2003

(65) Prior Publication Data

US 2003/0187155 A1    Oct. 2, 2003

Related U.S. Application Data

(63) Continuation-in-part of application No. 09/683,984, filed on Mar. 8, 2002, now Pat. No. 6,743,375, which is a continuation-in-part of application No. 09/714,043, filed on Nov. 16, 2000, now Pat. No. 6,491,845.

(51) Int. Cl.
| | |
|---|---|
| C08G 59/46 | (2006.01) |
| C08G 59/56 | (2006.01) |
| C08G 59/62 | (2006.01) |
| C08L 63/00 | (2006.01) |
| C08L 63/02 | (2006.01) |

(52) U.S. Cl. ............... 528/117; 525/486; 525/510; 525/523; 525/524; 528/107; 528/110; 528/111; 528/112; 528/113; 528/121; 528/123; 528/124

(58) Field of Classification Search ............. 525/523, 525/486, 510, 524; 528/112, 117, 107, 110, 528/111, 113, 121, 123, 124
See application file for complete search history.

(56) References Cited

U.S. PATENT DOCUMENTS

| | | | | |
|---|---|---|---|---|
| 4,221,890 A | * | 9/1980 | Dimmick | 525/407 |
| 4,417,010 A | * | 11/1983 | Shimp | 523/566 |
| 4,668,718 A | * | 5/1987 | Schreiber | 523/451 |
| 4,772,645 A | * | 9/1988 | Tarbutton et al. | 523/457 |
| 5,606,006 A | * | 2/1997 | Wang | 528/87 |
| 6,140,430 A | * | 10/2000 | Ruth et al. | 525/524 |

FOREIGN PATENT DOCUMENTS

| | | | |
|---|---|---|---|
| CH | 518334 A | * | 11/1971 |
| JP | 61019640 A | * | 1/1986 |
| JP | 01165654 A | * | 6/1989 |
| JP | 07258384 A | * | 10/1995 |

OTHER PUBLICATIONS

Abstracts for Japanese Patent No. 61-72018 A, Matsushita Electric Works, Ltd., Japan, Apr. 1986.*
Abstracts for Japanese Patent No. 61-148228 A, Ajinomoto KK [AJIN], Jul. 1986.*
Abstracts for Korean Patent No. 2001-65809 A, Korea Chemical Co. Ltd. [KOCHN], Jul. 2001*

* cited by examiner

Primary Examiner—Robert Sellers
(74) Attorney, Agent, or Firm—Notaro & Michalos P.C.

(57) ABSTRACT

Hardeners are provided for curing epoxies at lower temperatures than currently available hardeners while retaining superior mechanical and thermal properties. A first component is selected from imidazole, dicyandiamide, or a mixture of polyamines and tertiary amines. A poiyol mixture is then selected. The first component is combined with the polyol mixture to form a hardener. The hardener is combined with epoxy resin and is cured. A method for selecting a hardener to yield an epoxy-hardener system with good properties after curing at a specified temperature and time includes selecting components for the hardener so the glass transition temperature of the cured epoxy-hardener system is not significantly lower than 45° C. above the cure temperature. The method includes steps for adjusting and controlling the ultimate glass transition temperature to maximize the mechanical properties of the epoxy-hardener system. The method regularly produces hardened epoxy systems having about 90% or more epoxy groups reactect.

5 Claims, 1 Drawing Sheet

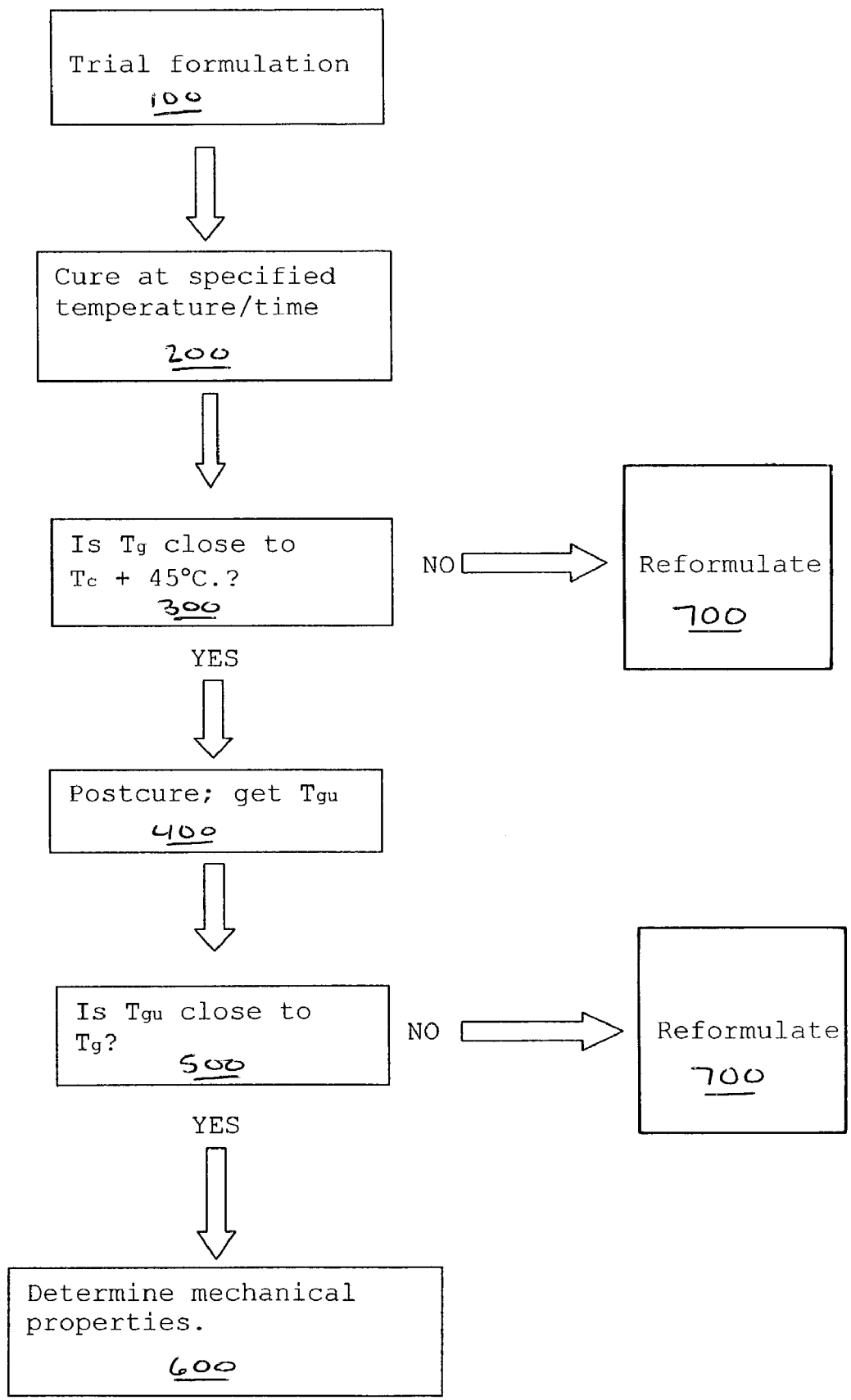

EPOXY HARDENERS FOR LOW TEMPERATURE CURING

CROSS-REFERENCE TO RELATED APPLICATIONS

This application is a continuation-in-part of U.S. patent application Ser. No. 09/683,984, filed Mar. 8, 2002, now U.S. Pat. No. 6,743,375, which is a continuation-in-part of U.S. patent application Ser. No. 09/714,043, filed Nov. 16, 2000, now U.S. Pat. No. 6,491,845, the entirety of each of which are hereby incorporated by reference.

BACKGROUND OF THE INVENTION

The present invention relates generally to epoxy hardeners and in particular to new and useful groupings of epoxy hardener compositions which rapidly cure an epoxy resin over a range of temperatures and a method for selecting hardeners to obtain particular characteristics of hardened epoxies.

There are two general types of polymers; thermoplastic and thermosetting. Thermoplastic polymers melt on heating and solidify on cooling. They can be remelted and resolidified repeatedly within limits.

Thermosetting polymers do not melt on heating. They soften only and, if heated sufficiently will char. Thermosetting resins such as epoxies are molded by either injecting or placing by hand a prepolymer mixture consisting of epoxy resin, hardener, catalyst and various modifiers and fillers into a mold and heating for a time sufficient to complete the chemical reactions between the epoxy resin and the hardener, resulting in a thermosetting polymer having the shape and size of the mold. Molding times are considerably longer than for thermoplastic molding processes, typically five to fifteen minutes. However, injection pressures are low and so the mold clamping forces needed are also low. Thus, thermoset molding processes are characterized by low production rates and relatively low capital investment. But, large part sizes are possible.

The curing reactions of epoxies are exothermic and cure times and temperatures are determined by the heat transfer rate from the mold to the part and the scorch temperature of the epoxy. Epoxy/hardener systems which cure at low temperatures and which develop low exotherm as a result of chemical factors are very advantageous since they can be cured faster and will result in higher production rates.

For hand application, the epoxy resin and hardener are usually supplied in two separate syringes which have a common plunger. Pressing the plunger releases the correct proportions of epoxy and hardener. The two compounds are mixed with a spatula and applied to the bonding surfaces and then cured either at room temperature or at elevated temperature, depending on the application. Epoxy hardeners which cure rapidly at low temperature develop higher bond strength due to lower shrinkage stresses and permit higher production rates with lower energy expenditure.

Epoxy adhesives are frequently used in industrial processes in the form of "film adhesive". A prepolymer mixture of epoxy, hardener, and other desired components is applied as a coating onto a polymer film substrate, rolled up and stored in a freezer to stop the chemical reactions between components. When needed, the film adhesive is removed from the freezer and applied to a metal or composite part, the backing is stripped off and the assembly completed and cured in an oven or autoclave.

At the point when the adhesive is removed from the freezer, the epoxy mixture begins to cure slowly at room temperature. After a certain time called the "out time", the adhesive will become stiff and brittle and unusable. Latent mixtures having long out times are highly desirable in order to complete complex assemblies before curing. Hardeners having very long out times, or latency, but with relatively low cure temperatures and short cure times are difficult to create, further increasing their value.

Hardeners for epoxies are known and have been disclosed, for instance in U.S. Pat. No. 3,812,202, which teaches a two part self-hardening epoxy composition which is formed by a phenol precursor combined with a methylol acrylic polymer. The phenol precursor is made by combining bisphenol A with a polyepoxide compound to create a composition having two or more phenolic groups. The methylol acrylic polymer can be formed by polymerizing acrylamide or diacetone acrylamide with other ethylenically unsaturated monomers, followed by adding an aldehyde, such as formaldehyde, and optionally, a catalyst. The phenol precursor and methylol acrylic polymer are mixed to a desired viscosity, applied, and heated to at least about 300° F. to cure.

U.S. Pat. No. 4,866,133 discloses a curing agent for an epoxy containing a polymeric phenol and a polyamine. The curing agent is provided as a powdered latent curing agent mixed with a liquid epoxide resin. Polyamines used in the curing agent include diethylenetriamine and triethylenetetramine, among others. The polymeric phenols include different novolaks prepared from bisphenol A and formaldehyde, a novolak prepared from p-cresol and formaldehyde and a poly(p-vinylphenol), among others. The curing agent is activated by heating to at least about 60° C.

U.S. Pat. No. 5,107,036 teaches a curing agent for epoxy which is a combination of two phenol compounds. One phenol is a polyhydric phenol, formed from a condensation reaction of a phenol having at least one phenolic hydroxyl group with a hydroxybenzaldehyde compound. The hydroxybenzaldehyde used in the condensation reaction must have a hydroxyl group and an aldehyde group bonded to a benzene ring, which may be substituted with at least one other constituent. The other phenol is a dihydric phenol, such as catechol, resorcinol, and bisphenol A.

Mixtures of bisphenol A and an aliphatic polyamine are disclosed in U.S. Pat. No. 4,221,890. In one embodiment, butyl glycidylether is added to the mixture which may result in the conversion of some of the bisphenol A to a secondary polyol, as well as the formation of adducts of the polyamine with the monoepoxide. There is no appreciation for the exothermic nature of the reaction between bisphenol A and the polyamine. Further, there is no consideration of the use of methylol-functional hardeners for epoxy resins, either alone or in combination with other types of polyols.

Mannich and Schiff bases are generally known. For example, Canadian patent 591,210 to Zumstein, published Jan. 19, 1960, describes a number of Mannich bases having at least one tertiary amine group and at least one phenolic hydroxyl group as accelerators for curing mixtures of epoxies, polyamides and polyamines. The product consisting of one mole alkylphenol, one mole diethanolamine and one mole formaldehyde is also disclosed in the Canadian patent. None of the formulations described contain a polyol, however, and latency properties are not disclosed. The Mannich base consisting of one dialkylaminopropylamine group and one phenolic hydroxyl group and having unique properties as a latent hardener for epoxies has not been described. The corresponding Schiff bases are not described as latent epoxy hardener components either.

Similar products have been known for a long time, for example 2,4,6-tris(dimethylaminomethyl)phenol, which is an available industrial product. See, H. A. Bruson and C. W. MacMullen, "Condensation of Phenols with Amines and Formaldehyde", Jl. Am. Chem. Soc., 63, 270 (1941).

European patent application EP 84301251.9 to McClain, describes an epoxy hardener consisting of a mixture of imidazole, TMP and butanediol which is soluble in epoxy and which is disclosed as curing an epoxy at 93° C.

Examples #1 and #4 of the McClain EP patent application were reproduced. But, instead of curing the samples at 93° C., an attempt was made to cure them at 65° C. These samples identified as #EP-1 and #EP-4 are described below:

EP-1: 1.7 phr Imidazole, 0.71 phr TMP, 1.0 phr butanediol and 0.19 phr water were blended together in the order given, heating the Imidazole and TMP as required and 5 g EPON828 was then added. This sample was heated at 65° C. After 4 hrs, the sample was hard, slightly dentable with a spatula, and had a tacky surface film.

EP-4: 1.7 phr Imidazole, 1.1 phr TMP and 2.2 phr butanediol were blended together in order and 5 g. EPON828 was then added. After 4 hrs. at 65° C. this sample was hard, slightly dentable with a spatula and had a tacky surface film.

Further testing revealed that both samples were weak and brittle after curing. Hardened epoxies having such properties are useless in the majority of applications. Thus, the epoxy hardeners disclosed in the EP application of McClain clearly require the elevated cure temperature to produce a useful result.

It can be concluded that the degree of cure of both samples was too low to develop good mechanical properties. The tacky surface film on both samples appeared to be primarily butanediol, due to the slow reaction rate of this polyol with the epoxy at the lower 65° C. temperature. Further, the poor compatibility of the butanediol with the partially cured epoxy resulted in migration to the surface and exudation, similar to the behavior of an incompatible plasticizer.

It has been shown that the degree of cure of an epoxy-hardener system is indicated by the relative proximity of the glass transition temperature ($T_g$) of the cured epoxy system to the ultimate glass transition temperature ($T_{gu}$) of the same epoxy system cured at a sufficiently high temperature to attain the maximum value of the glass transition temperature. The glass transition temperature $T_g$ has no particular significance of itself in determining the degree of cure: it is only the value of $T_g$ relative to the ultimate glass transition temperature $T_{gu}$ which is significant.

Extensive experimentation with epoxy-hardener systems has shown that the curing reactions cease when the glass transition temperature $T_g$ reaches about 40–45° C. above the cure temperature, $T_c$, due to viscosity effects. The maximum glass transition temperature which can be obtained is therefore given approximately by the equation: $T_g=T_c+45°$ C.

The industries which use epoxy systems are continually pressing for lower cure temperatures and shorter cure times for largely economic reasons. In particular, high cure temperature epoxy-hardener systems require specialized ovens or other means to cure products using such epoxy-hardener systems. Since the ultimate glass transition temperature (which represents the fully cured state) can only be achieved by curing the epoxy-hardener mixture at a temperature above the ultimate glass transition temperature, it follows that all practical epoxy systems are undercured.

Clearly, there are many uses for epoxies and epoxy systems. For example, applications exist for epoxy systems in military and aerospace products, civil aircraft, sporting goods such as fishing rods, golf club shafts, tennis rackets, bows and arrows and the like, as rust preventative coatings, and potting of electronic circuits and electronics components, among others. Epoxy hardeners which can more rapidly cure epoxy without foaming or resulting in unstable compositions are desirable and useful. Hardener compositions which provide long latency periods when combined with epoxies have many applications also. And, hardeners which can cure epoxies at relatively low temperatures yet produce good mechanical properties in the hardened epoxy system are very useful.

SUMMARY OF THE INVENTION

It is an object of the present invention to provide a method for efficiently designing hardener compositions for epoxy resins which yield hardened epoxy systems with good characteristics.

It is a further object of the invention to provide a method for forming an epoxy hardener composition and evaluating the epoxy hardener composition for use in curing epoxy resins at a given cure temperature.

Another object of the invention is to provide hardener compositions for epoxy resins to create cured epoxy systems in which at least 70% and preferably 90% or more, of the epoxy groups are reacted.

Three classes of new epoxy hardeners which have increasing cure temperatures are provided. The Class I epoxy hardeners cure at temperatures between about 20–50° C., Class II hardeners cure between about 60–100° C. and Class III hardeners cure at about 120° C. Class I hardeners contain mixtures of one or more polyols, polyamines and tertiary amines, while Class II hardeners have the same polyols combined with one or more tertiary amines. Class III hardeners contain the same polyols combined with either imidazole or dicyandiamide and optionally, a tertiary amine.

Polyols which are used to form each of the different classes of epoxy hardeners are classified into two groups: Group A consisting of polyols with phenolic hydroxy groups, secondary alcohols or combinations thereof, and group B consisting of polyols having methylol functional groups, secondary alcohols or combinations thereof. In addition, Group B contains two polyols consisting of a single carboxylic acid group and two methylol groups. Epoxy hardener compositions according to the invention will contain one or more polyol from group A and one or more polyol from group B, or alternatively, only polyols from group B, with the other elements required by the class of hardener being created.

Hardeners for epoxy resins are provided which are curable at lower temperatures, in shorter times and with lower exotherm than existing hardeners. A subclass of these hardeners exhibits extended latency, or pot life. They are easily handled liquid materials having a range of viscosities, thereby allowing a wide latitude in their use in formulations. These hardeners are made from inexpensive, readily available industrial chemicals and have low odor. The hardener components do not require special handling and are non-reactive when exposed to the atmosphere. Curing reactions between the hardeners and epoxy resins exhibit low exotherm and result in cured products having low cure shrinkage, high tensile strength and high toughness.

A method of designing epoxy hardener systems to produce a hardened epoxy includes the steps of forming a hardener by combining these polyols and polyamines and tertiary amines, or imidazole, or dicyandiamide, combining the hardener with an epoxy to form an epoxy hardener system, curing the epoxy hardener system at a pre-determined cure temperature and time, and then evaluating the epoxy hardener system in two steps. The first step requires determining whether a glass transition temperature of the epoxy-hardener system is approximately equal to the pre-determined cure temperature plus 45° C. If the glass transition temperature of the epoxy-hardener system is approximately equal to the pre-determined cure temperature plus 45° C. the second step is determinig the ultimate glass transition temperature of the cured epoxy-hardener system and determining whether the ultimate glass transition temperature is approximately equal to the glass transition temperature. Otherwise, the hardener is reformulated if the glass transition temperature is not approximately equal to the pre-determined cure temperature plus 45° C. The hardener is accepted if the ultimate glass transition temperature is approximately equal to about 45° C. above the pre-determined cure temperature or if the ultimate glass transition temperature is aporoxlmately equal to the glass transition temperature. Otherwise, the hardener is reformulated. The method of the invention provides solutions for producing epoxy-hardener systems with good mechanical and physical properties, especially when the curing conditions of temperature and time are fixed by a performance specification and cannot be altered by the formulator.

The method relies upon determining the value of $T_g$ relative to the ultimate glass transition temperature $T_{gu}$ for the epoxy-hardener system. If the $T_{gu}$ is significantly higher than $T_g$, the hardener system is reformulated so that $T_g$ approximates $T_{gu}$ when the system is cured at the selected cure temperature and time. Alternatively, the ratio of $T_{gu}$ to $T_g$ can be used to indicate the degree of cure.

The method of the invention includes formulating the epoxy hardener system so that the ratio of $T_{gu}$ to $T_g$ approaches unity as closely as possible. This is accomplished by either increasing $T_g$ or decreasing $T_{gu}$, the latter being a heretofore unrecognized possibility. Following the method of the invention results in a higher degree of cure, as indicated by values of this ratio approaching unity, thereby producing better mechanical and physical properties for the hardened epoxy system, even when $T_c$ is less than $T_{gu}$.

As noted above, the maximum glass transition temperature which can be obtained by curing at a given cure temperature is approximately represented by the equation: $T_g \cong T_c + 45°$ C. This does not mean that this value of the glass transition temperature is always to be obtained by the given curing process but that this is a maximum value that cannot be exceeded. But, in accordance with the inventive method, if it is found that the actual $T_g$ value that is developed by the given curing process is considerably less than this value, the formulation is defective in some way and should be modified.

The method provides two steps for formulating the systems to obtain good properties from epoxy-hardener systems, and particularly those that are undercured:

i) Ensure that the formulation is such that the maximum admissible value of $T_g$ is obtained by the given cure process; and ii) Reduce the value of $T_{gu}$ to as low a value as possible. A value of $T_{gu}$ much above $T_g$ is detrimental to the mechanical and physical properties of the "cured" epoxy.

The formulation tools used in the method to achieve the above stated objectives in accordance with the method of the invention are as follows.

The glass transition temperatures of epoxy systems intended to cure at low temperatures are low, as explained above. It has been found that highly functional hardener components are not required, and, in fact, are detrimental to the development of good physical and mechanical properties. Since primary amines possess two active hydrogens per amine group, primary polyamines are inherently of high functionality and are generally useful for low temperature curing applications only when used at concentrations below their stoichiometric value and in combination with other hardener components of low functionality, principally polyols. Tertiary amines do not normally give rapid cures at low cure temperatures when used as the sole hardener component but, when combined with suitable polyols, they can not only produce rapid, low temperature curing but the polyols can be chosen so as to control the glass transition temperature, the mechanical and physical properties and even the latency of the epoxy system.

Step (i) above is controlled primarily by the chemical properties of the polyols, particularly the relative acidity and the concentration.

Step (ii) above is controlled primarily by the physical properties of the polyols, particularly the number of functional groups, the overall length of the molecule between functional groups, the aliphatic/aromatic character and the concentration.

Thus, the chemical and physical properties of the various polyols control both the cure characteristics and the ultimate properties of epoxy systems. It can be seen that if this hardener technology is to be useful for a wide range of applications, there must be made available a large variety of polyols having different chemical and physical properties. This goal is achieved by the materials disclosed herein.

In accordance with a method of the invention, the polyols forming the hardener composition are selected to take advantage of the chemical and physical properties to produce epoxy-hardener systems having glass transition temperatures which meet the conditions above. The epoxy-hardener systems developed according to the method have predictably good mechanical and physical properties, even in cases where the systems are undercured.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter and drawing in which a number of preferred embodiments of the invention are set forth.

BRIEF DESCRIPTION OF THE DRAWING

The only drawing is a flow chart illustrating a method for developing an epoxy hardener composition.

DETAILED ESCRPTION OF THE INVENTION

The following abbreviations are used herein to indicate the identified chemical composition:

| Abbreviation | Chemical |
| --- | --- |
| BDMA | dimethylbenzylamine |
| BGE | butyiglycidylether |
| BHMC | 2,6-bis (hydroxymethyl)-p-cresol |
| BPA | bisphenol A |
| BPS | bisphenol S; 4,4'-sulfonyldiphenol |
| CAT | catechol or pyrocatechol |
| DELA | diethanolamine |
| DEAPA | N,N-diethyl-3-aminopropylamine |
| DETA | diethylenetriamine |
| DIPA | diisopropanolamine |
| EDA | ethylenediamine |
| DGEBA | diglycidylether-bisphenol A |
| DMBA | 2,2-bis (hydroxymethyl) butyric acid |
| DMPA | 2,2-bis (hydroxymethyl) propionic acid |
| EMI | 2-ethyl-4-methylimidazole |
| HQ | hydroquinone |
| Im | imidazole |
| NPG | neopentyl glycol |
| OC | o-cresol |
| PC | p-cresol |
| ROL | resorcinol |
| TDP | 4,4'-thiodiphenol |
| TETA | triethylenetetramine |
| TME | trimethylolethane |
| TMG | tetramethylguanidine |
| TMP | trimethylolpropane |

The invention will now be described preceded by an explanation of certain principles underlying the invention.

Hardeners for epoxy resins are provided which have the capability of curing at lower temperatures and shorter times and with lower exotherm than existing harderiers. A subclass of these hardeners exhibits extended latency or pot life. They are easily handled liquid materials having a range of viscosities thus allowing wide latitude in formulating. They are made from cheap and readily available industrial chemicals; they have low odor and are easily handled and non-reactive when exposed to the atmosphere. Curing reactions with epoxy resins exhibit low exotherm and give cured products having low cure shrinkage, high tensile strength and high toughness.

In the description of the invention, the following standard notation and definitions are used.

The notation A.B means a mixture of A and B in 1:1 molar ratio and the components of the mixture are assumed to have intermolecular bonding forces which result in a particular physical form of the product, such as a medium viscosity liquid or a low melting crystalline solid. These are also known as molecular complexes.

The notation xA.yB means a mixture of A and B as above, but in a molar ratio of x:y.

The notation A/B means an adduct or a product produced by the chemical reaction of A and B, regardless of whether the reaction is addition or condensation. The nature of the reaction will be understood by a reader having ordinary knowledge of chemistry.

The notation "phr" means parts per hundred resin.

Cure times are expressed as cure temperature in degrees Celsius over a time period as ° C./hour.

"Polyol" is defined as a material having typically two to three reactive groups consisting of phenolic hydroxyl, methylol, secondary alcohol and combinations of these. In addition, two polyols are identified which have one carboxylic acid group in addition to two methylol groups. A methylol compound is defined as a primary alcohol in which the beta carbon atom is either an aromatic ring carbon or a gem carbon (devoid of hydrogen atoms). A number of latent, tertiary amine-type hardeners are disclosed which contain a single phenolic group. These are listed with the polyols for convenience. The polyols used in the hardeners are defined more particularly below.

"Polyamine" is defined as an amine chosen from one of ethylenediamine, diethylenetriamine, triethylenetetramine, tetraethylenepentamine, hexamethylenediamine, 2,2,4-trimethyl-1,6-hexamethylenediamine, poly(propylene glycol)-bis(2-aminopropyl)ether. There are also available a large number of proprietary aliphatic polyamines which are useful and which are known to those who are practiced in the formulation art.

"Tertiary amine" is defined as a material having at least one tertiary nitrogen atom and may contain in addition, one or more reactive hydrogen atoms in the form of a phenol, secondary alcohol, secondary amine or primary amine. If there are no active hydrogens, the tertiary amine is an external plasticizer. If there are one or two active hydrogens, the tertiary amine is generally an internal plasticizer. Although imidazole is technically not a tertiary amine, it will be grouped with the tertiary amines for purposes of the invention and convenience, since it behaves like a tertiary amine in curing reactions.

The terms "cure" and "latency" are often used when describing the processing characteristics of mixtures of epoxy resin and one or more hardener components. In order to provide consistency to the use of these terms, the descriptions of these characteristics, as used herein, relies in part on several references taken from "Epoxy Resins: Chemistry and Technology", Clayton May editor, Marcel Dekker, 1988 ("May").

The term "cure" refers generally to a time and temperature controlled process wherein an epoxy-hardener mixture is converted into a useful solid material. A "complete" cure, defined by the theoretical condition that all of the epoxy groups have been consumed, is generally unattainable in practice. It is understood that, " . . . in order to approach complete cure a polymer must be given a postcure at a temperature higher than the glass-transition temperature of the system." [May, pp. 477–478.]

For example, a comparison of the cure of an epoxy with various aliphatic amines at 25° C. shows that no more than 70% of the epoxy groups were consumed after three weeks. [May, pg. 297, FIG. 4, and pg. 299, FIG. 5.] The explanation for this phenomenon is that, "when cure is conducted at ambient temperature without an exotherm, a given diglycidylether of bisphenol A, when used with any of the polyamines or modified polyamines, proceeds to a degree of reaction that corresponds to a heat-distortion temperature of about 60° C. At this point, the system becomes immobilized because of viscosity effects before all of the epoxy groups are consumed." See May, pg. 470.

The rates of reaction of various anionic curing agents were compared at 65° C. [May, pg. 494, FIG. 18.] The poorest hardener, 5 phr triethylamine resulted in the consumption of only 70% of the epoxy groups after 25 hours while the best hardener, 8 phr 2-ethyl-4-methylimidazole resulted in the consumption of 90% of the epoxy groups after 25 hours. Id.

The observation has been made that the heat-distortion temperature or glass transition temperature ($T_g$) of epoxy systems is limited to approximately 40–45° C. above the cure temperature. The inventor has recognized that the ultimate glass transition temperature, which is the maximum glass transition temperature value attained following a suitable elevated temperature postcure, should not be much higher than the actual glass transition temperature attained by the selected cure process in order to obtain good mechanical and physical properties.

For example, an epoxy system with good mechanical properties that was cured at 20° C. can have a glass transition temperature in the range of about 60–65° C., and its ultimate glass transition temperature ($T_{gu}$) should be near to the glass transition temperature ($T_g$) Similarly, an epoxy system designed to cure at 65° C. should not have an ultimate glass transition temperature much above about 105–110° C. in order to have good properties.

Good properties for a cured system may be defined generally as a cured epoxy having an adhesive shear strength of about 3,500 psi or better at room temperature, and 2,500 psi after prolonged exposure to 100% relative humidity at 70° C. Alternatively, good properties may be defined by other characteristics, such as peel strength, elevated temperature shear strength, weight gain due to water absorption, solvent resistance and others as well, as will be understood by one skilled in the art. However, only shear strength will be specifically referenced herein.

The reverse reasoning applied to the temperature relationship and properties is also useful. For example, if a glass transition temperature of 120° C. is required of a particular system, it should not be cured below approximately 75–80° C. in order to have good properties.

Low temperature curing is generally defined as curing epoxy-hardener systems at temperatures of less than about 100° C. Hardeners having cure temperatures in this range includes those referred to herein as Class I or Class II hardeners. Curing at lower temperatures is generally desirable for economy of production, as well as to reduce residual stresses in the cured parts, particularly in adhesive and composite applications.

The means whereby control of the glass transition temperature and mechanical or physical properties can be achieved has not been heretofore appreciated or understood, and the materials and methods needed to achieve this control have not been heretofore invented.

Given that the epoxy is generally of the DGEBA type, the use of monoepoxy diluents or monofunctional hardener components generally results in poor cured properties. Rather, the use of difunctional polyols having phenolic hydroxyl groups, methylol groups or secondary alcoholic groups used in combination with various types of aliphatic polyamines or tertiary amines provides the means of controlling both the glass transition temperature and the mechanical properties of the cured polymer.

The best epoxy system properties are obtained by formation of predominately linear polymer. The failure of the ethyleneamines to achieve good mechanical properties after room temperature curing is a result of their high functionality and consequently high ultimate glass transition temperatures. Much better results can be obtained by combining these polyamines with difunctional polyols which results in polyamine concentrations of less than stoichiometric and reduced average functionality. Alternatively, polyamines of lower functionality can be used in combination with various polyols to control the ultimate glass transition temperature and as a consequence, the final properties.

Tertiary amines perform best at relatively low concentrations. Attempts to increase the rate of cure by increasing the tertiary amine concentration do not result in commensurate increases in cure rate and since these amines are often monofunctional, they produce branched structures which have poor mechanical properties and reduced glass transition temperatures. The best way to increase the cure rate of tertiary amine-cured systems is to increase the polyol concentration since the primary cure mechanism of tertiary amines is the catalysis of the epoxy-hydroxyl reaction.

Various types of dihydric phenols generally require a minimum cure at 50–60° C. The other types of polyols containing methylol and secondary alcohol groups will cure at lower temperatures when combined with the appropriate amine components, as described further below, and give good properties as long as the overall guidelines stated above are followed.

While there are a number of ways to estimate the degree of cure of epoxy-hardener systems, the ratio of ultimate glass transition temperature to glass transition temperature ($T_{gu}/T_g$) is both convenient and useful. The glass transition temperature $T_g$ is measured on the cured epoxy that has been cured by the temperature/time process normally specified by the end-user. The ultimate glass transition temperature $T_{gu}$ is measured on the epoxy that has been cured at some temperature above $T_{gu}$ which ensures that the sample is fully cured and the maximum value of glass transition temperature has been reached. Any cure process for which the cure temperature is less that $T_{gu}$ results in undercured material. For economic reasons, virtually all industrial processes use cure temperatures which are below $T_{gu}$ and the products of these processes are therefore all undercured by definition. However, the properties of the undercured epoxy can be perfectly satisfactory if the hardener system is properly formulated.

The degree of cure can be maximized by making the value of $T_{gu}/T_g$ as close to unity as possible. Since $T_g$ can never equal $T_{gu}$ when $T_c<T_{gu}$, the ratio $T_{gu}/T_g$ can never theoretically equal unity. Nevertheless, the degree of cure can be improved either by increasing $T_g$ or decreasing $T_{gu}$ and the cured properties will be improved as a result.

Since the highest value of $T_g$ attainable is approximately $T_c+45°$ C. ($T_c$ is the cure temperature), the relative acidity of the polyols and their concentration must be so chosen that the indicated maximum $T_g$ is achieved by the given cure process. If the polyols are too acidic, the cure time will be too long and the material will not cure fully in the cure time allotted, resulting in a $T_g$ that is below the indicated maximum. If latency is an issue, the acidity of the polyols cannot be too low or the latency period will be too short. Thus, the acidity and concentration of the polyols must be properly chosen to produce an epoxy-hardener system with good properties, especially when satisfying predetermined latency, cure time and cure temperature constraints.

The ultimate glass transition temperature is controlled primarily by the physical properties of the polyols, particularly the number of functional groups, the overall length of the molecule between functional groups, the aliphatic/aromatic character and the concentration. The addition of quite low concentrations of the appropriate type of polyol to a hardener formulation tends to reduce the ultimate glass transition temperature to a surprising degree. By decreasing the ultimate glass transition temperature, the degree of cure can be increased and the cured properties will be improved as a result.

A sufficient inventory of polyols having a broad range of chemical and physical properties must therefore be available to the formulator to allow both the process properties and the cured properties of the epoxy-hardener system to be controlled.

Latency, or pot life, is that property of an epoxy-hardener mixture which results in a slow rate of viscosity increase at ambient temperature. In film adhesive and composite manufacturing operations, this property allows these materials to remain soft, flexible and tacky for a sufficient time to complete complex assemblies before starting the curing process.

The design of epoxy-hardener systems having extended latency at room temperature as well as curing at low temperature has been universally regarded as a difficult assignment. That is, the desired cure temperature is sometimes so close to room temperature or even equal to room temperature that the question of latency period (at room temperature) degenerates to the problem of controlling pot life while at the same time curing at room temperature within a specified time period. For example, it is entirely feasible, using the invention herein to create an epoxy hardener having a latency period (pot life) at room temperature of 6–8 hours, but which will cure at room temperature within 16–24 hours.

An understanding of the effects of relative acidity/basicity, molecular structure and degree of polarity on the bond strength of molecular complexes is essential to success. It has not been heretofore understood that certain polyols, in combination with various types of amines, can provide the unique combination of latency, rapid cure at relatively low cure temperatures and good properties after curing that are desirable in modern applications.

A set of experimental procedures for carrying out preliminary design of epoxy hardeners has been derived from the preceding technical discussion.

It is often the case that hardened epoxy material properties and process conditions are specified, or pre-determined, for a particular use. These conditions typically include the cure temperature and cure time and a set of required minimum mechanical properties for the hardened epoxy. A maximum use temperature is also often specified; that is, the highest temperature the hardened epoxy system must endure when used in the intended application. This places a lower limit on $T_g$, and therefore, a lower limit on the cure temperature $T_c$.

If the desired cure temperature is in the 20–50° C. range and the pot life, or latency, is only a few hours, an aliphatic polyamine, such as DETA, TETA or D230, can be chosen as the basis for the hardener. The selected polyamine is then combined with a polyol selected to reduce the functionality of the hardener. The stoichiometric concentration of the trial hardener composition is then calculated. The hardener is combined with an epoxy to create a sample that corresponds to the process specifications (cure time and temperature, etc.). The glass transition temperature is then determined and checked against the formula:

$$T_g \cong T_c + 45° \text{ C.} \quad (1)$$

where $T_g$ is the glass transition temperature, $T_c$ is the desired cure temperature and the units of each are degrees Celsius. The $T_c$ and $T_g$ are both known. If the value of $T_g$ approximates the indicated maximum value of $T_c+45°$ C., the degree of cure is sufficient, the cure was successful and further testing can continue; if not, the hardener must be reformulated to improve the degree of cure.

There are a number of methods for determining glass transition temperatures that do not give identical results. Most of the data cited herein were obtained using Thermo-Mechanical Analysis (TMA) in which a loaded probe was pressed against a sample which was heated at a controlled rate. The temperatures for initial penetration and subsequent expansion were then averaged to arrive at an estimate of the glass transition temperature. Dynamic Mechanical Thermal Analysis (DMTA) imposes a torsional oscillation on the sample and the dynamic modulus is monitored as the sample is heated at a controlled rate. If the temperature at which the dynamic modulus undergoes a rapid drop is taken as the glass transition temperature, the result is generally lower than that obtained by TMA by about 5° C. Thus, if the test method is DMTA, the above rule (1) would instead be expressed as $T_g \cong T_c + 40°$ C.

In the case where the first test is satisfied, then the $T_g$ must also be evaluated to determine if it exceeds the application use temperature, when known.

A second measure is to determine the ratio $T_{gu}/T_g$, thereby giving a further indication of the degree of cure of the system. The quantity $T_{gu}$ represents the "cure capacity" of the epoxy-hardener system. The quantity $T_c+45°$ C. represents the upper limit on the glass transition temperature imposed by the viscosity of the partly cured epoxy-hardener system. If $T_{gu}$ is too far above $T_c+45°$ C., or the ratio of $T_{gu}/T_g$ is too far above unity, the actual degree of cure is too far below the "cure capacity" and poor properties will result in the "cured" epoxy-hardener system.

Because the $T_{gu}$ can only be achieved by curing at a temperature which is higher than the ultimate glass transition temperature, it is not possible for $T_g$ to actually equal $T_{gu}$, and thus, it is not possible for the ratio $T_{gu}/T_g$ to equal unity. The ratio is valuable however, as a good indicator of the degree of cure; the degree of cure increases as the ratio approaches unity. Values of the ratio exceeding unity ($T_{gu}/T_g>1$) indicate various degrees of undercure.

With reference to the Examples below, Example I.6 was cured at temperatures ranging from 20–30° C., and had a $T_g$ of 72° C., which is very near the predicted maximum of 75° C. And, the $T_g$ is well within the predicted range of 65–75° C. using formula (1), above based on the range of cure temperatures.

It should be noted that glass transition temperatures identified herein were determined by Thermo-Mechanical Analysis (TMA) using an average of the penetration and expansion values. If the $T_g$ is instead based upon initial penetration values alone, the indicated values will be reduced by about 5° C., and formula (1) should be adjusted to only add 40° C. to $T_c$, rather than 45° C., as discussed above.

In Example I.7, the sample was cured at 20–30° C., but the $T_g$ was found to be only 60° C.—nearly 15° C. below the predicted maximum possible value. Even after a 50° C. postcure, the $T_g$ only increased to 79° C., still well below the maximum possible value. This clearly indicates that the hardener composition as formulated does not cure well for the selected process specifications.

Example I.8, however, demonstrates how the hardener composition of Example I.7 can be reformulated using the polyols and methods of the invention. In Example I.8, the concentration of DETA was increased, so that the stoichiometric fraction of DETA was 0.769, compared to 0.625 in the prior example. Example I.8 illustrates that the problem of the Example I.7 composition was the insufficient concentration of DETA, which has a limited capacity to catalyze the epoxy-hydroxy reactions. These examples also demonstrate that the dihydric phenols do not react fully at $T_c$ between 20–30° C. Later experiments by the inventor have demonstrated that a $T_c$ of at least about 50° C. for such hardeners is needed to produce good properties in the hardened system. The other Examples below also support similar conclusions, and show that good properties are obtained when $T_{gu}$ is near to $T_g$; i.e., when the ratio $T_{gu}/T_g$ nears unity.

It should be understood as well that when the selected $T_c$ is between 50–100° C., the hardener composition design procedure is the same, except that the basis for the hardener will be one or more of the tertiary amines.

Referring now to the drawing, the above process is illustrated as a flow chart of the basic steps for testing and evaluating an epoxy hardener formulation. The description of the process assumes the existence of a particular application having required hardened epoxy characteristics and a specified cure process ($T_c$ and time) for which the hardener will be used. However, it should be clear that the method may be used to design epoxy hardeners that produce cured systems with good properties for general use as well.

First, a trial formulation is created 100 using the general rules for the three Classes of hardeners described herein, based on knowledge of specified or desired cure temperature. The trial formulation is then cured 200 at the specified cure temperature and time. The $T_g$ value is obtained using TMA, or other methods, and compared 300 to the maximum value of $T_c+45°$ C., in accordance with formula (1), to evaluate the degree of cure. If the $T_g$ value is too low, the degree of cure is insufficient and the hardener composition is reformulated 700 using the methods described in greater detail below. For determining if the degree of cure is sufficient using the formula (1), the determined $T_g$ is preferably within 20° C. of the $T_c+45°$ C. value, more preferably within 10° C., and most preferably, within 5° C., assuming the TMA method is used to determine $T_g$.

If the $T_g$ is sufficiently high, the system is postcured and the $T_{gu}$ of the system is determined 400. The $T_{gu}$ and $T_g$ are compared 500, either directly, or evaluation whether the ratio of $T_{gu}/T_g$ sufficiently approximates to unity to indicate a good cure. If the ratio is too high, or the absolute values of $T_{gu}$ and $T_g$ indicate a poor cure, the hardener composition is reformulated 700. A ratio $T_{gu}/T_g$ of 1.2 or less indicates an acceptable cure, while ratios of 1.1 or less are preferred and 1.05 or less are most preferred.

If the hardener composition has produced an epoxy-hardener system which satisfies both tests 300, 500, then the hardener is acceptable. The hardener will produce a cured epoxy-hardener system having good properties using the specified cure process. The mechanical and physical properties of the hardened system can be determined 600 to confirm the hardener is acceptable for the specified application.

An alternative second evaluation 500 of the hardener formulation is to instead compare the $T_{gu}$ to the cure temperature $T_c$. By way of further explanation, if the desired cure temperature is 20° C., the $T_{gu}$ of the hardened epoxy should not be too far above 65° C. If the pre-determined cure temperature is 50° C., the hardened epoxy $T_{gu}$ should not greatly exceed 95° C., and so on. If it is decided to accept a hardened epoxy system with a $T_{gu}$ which is, for example 30° C. above the actual $T_g$, it should be expected that the mechanical properties of the system will be inferior to those of a system which has a $T_{gu}$ value only 10° C. above the actual $T_g$.

The principle of the preceding discussion is illustrated by the equation:

$$T_{gu} \approx T_c + 45° \quad (2)$$

which correlates the cure temperature to the ultimate glass transition temperature. It should be observed that the "approximately equal" notation is used advisedly; it is not possible for both sides of equation (2) to be exactly equal, since the ultimate glass transition temperature can only be developed by curing at a temperature higher than $T_{gu}$. Rather, equation (2) should be interpreted to mean that the hardener system should be formulated so that the $T_{gu}$ approaches the value of $T_c+45°$ C. as closely as possible. Preferably, the $T_{gu}$ is less than 20° C. above $T_c+45°$ C., more preferably $T_{gu}$ is less than 10° C. above $T_c+45°$ C. and most preferably, it is less than 5° C. above $T_c+45°$ C.

DETA and TETA used alone, for instance, both give $T_{gu}$ values of 120° C. at their stoichiometric concentrations in EPON828. From formula (2), the minimum cure temperature for either of these amine hardeners would be 75° C. This is consistent with the poor properties of hardened epoxies obtained using these hardeners at cure temperatures below 75° C.

As applied to the illustrated method, if the ultimate glass transition temperature determined 400 using the initial trial hardener formulation exceeds that specified by formula (2), the hardener must be reformulated 700.

There are two steps in reformulating 700 the systems to obtain good properties from epoxy-hardener systems, and particularly those that are undercured:

(i) Ensure that the formulation is such that the maximum admissible value of $T_g$ is obtained by the given cure process; and (ii) Reduce the value of $T_{gu}$ to as low a value as possible.

Step (i) above is controlled primarily by the chemical properties of the polyols, particularly the relative acidity and the concentration, and by the effectiveness of the amine component (Class II hardeners). It has been found, for example, that polyols with a $K_a = 10^{-5}$ will not cure an epoxy at temperatures much below about 85° C. In contrast, a polyol or polyol mixture with a $K_a = 10^{-15}$ can cure most epoxies at room temperature. Thus, reformulating using option (i) includes adjusting the relative acidity and concentrations of the polyols in the hardener composition. In particular, reformulating the hardener composition to increase the $T_g$ under step (i) includes either selecting a different amine component, increasing the concentration of the selected amine component, reducing the acidity of the polyol, increasing the concentration of the polyol, and combinations thereof.

Step (ii) above is controlled primarily by the physical properties of the polyols, particularly the number of functional groups, the overall length of the molecule between functional groups, the aliphatic/aromatic character and the concentration.

Methods for reformulating 700 the hardener composition to reduce the $T_{gu}$ under step (ii) include either using a higher concentration of the selected polyol, changing to a more flexible polyol, changing to a amine component of lower functionality when one is used, reducing the concentration of the amine component, reducing the functionality of the polyol, and combinations thereof. In any case, the presence of the polyol, which generally has low functionality, exerts a strong influence on the $T_{gu}$ both because the average functionality of the hardener is reduced and because the stoichiometric fraction of the polyamine component is also reduced. The stoichiometric fraction is defined as the ratio of the actual concentration to the stoichiometric concentration. This procedure is repeated until the actual ultimate glass transition temperature is approximately equal to the theoretical value obtained using formula (2), above.

The resulting cured epoxy will then have good mechanical properties as a result of the achievement of a high degree of epoxy reaction but which is still inevitably less than 100%. Experimental results demonstrate about 90% consumption of epoxy groups when the formulation methods above are followed.

If the hardener is required to impart a significant period of latency, a tertiary amine is usually chosen as the primary hardener and is combined with a polyol of appropriate relative acidity to control the latency period. The acidity of the polyol also cannot be too high or the mixture will cure too slowly at the required cure temperature. Otherwise, the experimental procedure is the same as specified above. Example II.1 illustrates this type of application.

Cure temperatures are generally above 50° C. for applications requiring significant latency but there are exceptions.

The concentration of the polyol and the functionality affect both the latency and the cure rate. It was surprisingly discovered how effective low concentrations of difunctional polyols can be in reducing the ultimate glass transition temperature.

Once the basic chemical and thermal properties of the formulation have been set, mechanical and other required properties can then be measured. Good mechanical properties will generally be obtained by following the above procedure. Minor changes in material concentrations and/or selections may be necessary to meet other requirements.

It is sometimes possible that a manufacturer will supply an incompatible set of performance specifications for an epoxy adhesive system. For example, the epoxy-hardener system may need to exhibit a glass transition temperature of 120° C., but a single lap shear strength of 3,500 p.s.i. following a 50° C. cure. Experimentation by the inventor supports the idea of the invention that no matter how long an epoxy-hardener system having a $T_{gu}$ of 120° C. is cured at 50° C., it will never exhibit the desired good mechanical properties because it violates the rule of formula (2) by a wide margin.

Combinations of cure temperature and ultimate glass transition temperature violating formula (2) may be acceptable if only minimal mechanical properties are required of the resulting undercured system; that is, if the sub-normal cure can still produce minimum acceptable mechanical properties. Referring to the above example, if the required single lap shear strength is only 2,000 p.s.i. after the 50° C., sub-normal cure cycle, a solution may be possible, particularly if the component is later subjected to a high temperature postcure of at least 75–80° C., thereby satisfying the condition of formula (2).

Epoxy Resins

Epoxy resins having utility with the previously described hardener systems are those which are produced by the reaction of epichlorohydrin with dihydric phenols, particularly bisphenol-A. These difunctional epoxy resins are relatively cheap, industrial commodities available in a range of viscosities. Viscosity is often an important attribute of low temperature curing epoxy systems. Other occasionally useful diepoxides are based on aliphatic diols such as neopentylglycol. Other epoxy resins of higher functionality are commonly available. But, higher functionality epoxies only make low temperature curing more difficult. Thus, they are not preferred in formulations designed for low temperature curing ($T_c$ is about 100° C. or less), as the general approach is to reduce system functionality in order to obtain good mechanical properties after low temperature curing.

Three Classes of Hardeners

The hardeners in accordance with the invention are divided into three Classes according to the temperature required to give complete curing: I) about 20–50° C., II) about 60–100° C. and III) 120° C. and higher.

Class I hardeners can cure an epoxy, such as Shell EPON828 epoxy, at temperatures of 20–50° C. and give latencies or pot lives ranging from ¼ hour to 8 hours. The Class I hardeners include mixtures of the polyols of groups A and B or at least one group B polyol combined with polyamines and optionally, tertiary amines.

Class II hardeners have mixtures of the group A and B polyols or at least one group B polyol combined with one or more tertiary amines. Imidazole is classified as a tertiary amine for use in Class II hardeners. Mixtures of these materials with an epoxy provide all of the advantages cited above but give pot lives (latency) at room temperature ranging from 1–10 days, and yet many of these epoxy-hardener systems cure (about 90% of the epoxy groups reacted) at temperatures as low as between 60–65° C.

Class III hardeners consist of the same polyols combined with either imidazole or dicyandiamide and, in some cases a tertiary amine. When imidazole is used, rapid curing systems are obtained which are suitable for reaction injection molding at 120° C. or, with a slight modification, thermoset injection molding. The systems based on dicyandiamide provide very long pot lives (latency) at room temperature, while curing rapidly at 120° C.

Epoxy hardener compositions according to the invention contain one or more polyol from group A, or phenolic polyols, and one or more polyol from group B, or methylol polyols, in addition to the other elements required by the class of hardener being created. Alternatively, the hardener compositions contain one or more methylol polyols from group B only, with the other elements required by the particular class of hardener. The two groups of polyols preferred for use with the Class I, II and III hardeners are listed below:

The Polyols

The following polyols form the group A polyols:

A1. dihydric phenols (ex.: catechol, resorcinol, hydroquinone, bisphenol A, bisphenol E, bisphenol F, bisphenol T (4,4'-thiodiphenol), bisphenol S);

A2. adduct of a dihydricphenol with 1–2 moles of a monoglycidyl compound (butylglycidylether preferred);

A3. adduct of a diglycidyl compound with 2 moles of a dihydric phenol;

A4. a series of dihydric phenols with flexible backbones obtained by reacting two moles of o-cresol with one mole of an aliphatic primary or secondary diamine and two moles formaldehyde—the resulting product is a di-Mannich base;

A5. a series of dihydric phenols with flexible backbones obtained by reacting two moles of 4-hydroxybenzaldehyde with one mole of an aliphatic, primary diamine—the resulting product is a di-Schiff base;

A6. adduct of a 4-alkylphenol with 1 mole N,N(dialkylamino)-3-propylamine and one mole formaldehyde;

A7. adduct as described in A6, above, but using a 2-aikylphenol—the resulting product is isomeric to that described in A6;

A8. adduct obtained by reacting 1 mole salicylaldehyde with 1 mole N,N(dialkylamino)-3-propylamine—the resulting product is a Schiff base;

A9. adduct formed by reacting 1 mole 4-hydroxybenzaldehyde with 1 mole N,N(dialkylamino)-3-propylamine—the resulting product is a Schiff base isomeric to that described in A8;

A10. adduct of a 4-alkyl phenol with one mole diethanolamine and one mole formaldehyde;

A11. an isomer of A10 using a 2-alkyl phenol.

The following polyols form the group B polyols:

B1. trimethylolpropane(TMP);
B2. trimethylolethane (TME);
B3. neopentyglycol(NPG)(2,2-dimethyl-1,3-propanediol);
B4. 2,2-bis(hydroxymethyl)propionic acid (DMPA);
B5. 2,2-bis(hydroxymethyl)butyric acid (DMBA);
B6. an adduct (TMPA)formed by reacting an excess of TMP with a diglycidyl compound using an appropriate catalyst, the result being a viscous liquid form of TMP containing both unreacted TMP in solution at room temperature and a high molecular weight adduct of two moles TMP with the chosen diglycidyl compound;
B7. adduct of trimethylolpropane (TMP) with 1–2 moles of a monoglycidyl compound (butylglycidylether preferred);
B8. adduct of a monohydric or dihydric phenol with 1–3 moles of trimethylolpropane, trimethylolethane or neopentylglycol (ring substitution);
B9. adduct of o-cresyl glycidylether with 2 moles of trimethylolpropane (one ring substitution, one epoxy reaction);
B10. adduct formed by first reacting trimethylolpropane with 2 moles of o-cresyl glycidylether (removes epoxy groups) followed by reacting additional 2 moles of trimethylolpropane or neopentylglycol (ring substitution);
B11. adduct of a diglycidyl compound with 2 moles of a monohydric phenol capable of ring substitution (for example o-cresol), followed by reaction with 2 moles of trimethylolpropane or neopentylglycol;
B12. adduct of an alkyiglycidyl or alkylglycidylether compound with 1 mole of a monohydric phenol capable of ring substitution followed by reacting 1 mole of trimethylolpropane or neopentylglycol;
B13. trihydric compound formed by reacting a 4-alkyl phenol with 2 moles of formaldehyde to produce methylol groups at the 2- and 6-positions.

It will be appreciated that the compounds set forth in the two groups of polyols are preferred for use, but that compounds which are functional equivalents to one of the recited polyols can be included within the same group and be within scope of the invention.

Description of the Various Polyols.

The crystalline dihydric phenols listed in group A can be combined with either aliphatic polyamines or tertiary amines to give liquid hardeners which will rapidly harden epoxies at low temperatures. However, these mixtures are very hygroscopic and the absorption of even small quantities of water severely inhibits the curing reactions. Further, water is very tightly bound and heating these mixtures does not result in complete drying with the result that these combinations are quite unpredictable in their curing action. It has been found that the addition of TMP to the mixture corrects these problems.

The addition of TMP has also been found to solve the problem that dihydric phenols are rigid molecules and successful curing still results in cured epoxies which are deficient in strength and toughness. The addition of TMP provides flexibility to the cured polymer and helps to relieve internal stresses.

Still more flexibility and toughness is generated in an epoxy-hardener system by replacing the dihydric phenols with adducts of the dihydric phenols and 1–2 moles of a monoglycidyl compound, typically butylglycidylether. This combination provides additional flexibility to the phenol itself and removes one or both of the phenolic hydroxyls which converts the molecule into a latent, liquid form. Butylglycidylether is preferred because the butyl group acts as a mild internal plasticizer which enhances toughness and flexibility. However other monoepoxides can be substituted.

Catechol is a special case and its use results in low glass transition temperatures and poor mechanical properties for the cured epoxy. Experimental results indicate that it is difficult to react both hydroxy groups with the epoxy, particularly at low cure temperatures.

However, reacting catechol with one mole of butylglycidylether results in a superior product which provides very fast cures when combined with a polyamine (Class I hardener) or good latency combined with fast cure at about 60–65° C. or higher (Class II hardener) and good mechanical properties of the cured epoxy.

Dihydric phenols can be generated by reacting a diepoxide with two moles of a dihydric phenol, particularly catechol, resorcinol or hydroquinone. If the diepoxide is aliphatic, for example butanediol-diglycidylether, neopentylglycoldiglycidylether or polypropyleneglycoldiglycidylether, a dihydric phenol with a flexible backbone is obtained. Such phenols have beneficial effects on the mechanical properties as well as reducing the ultimate glass transition temperature of the hardened epoxy. If a slow alkaline catalyst such as TMG is used for this reaction, products having reasonably low viscosities can be obtained.

Dihydric phenols with flexible backbones can also be produced by reacting a primary or secondary aliphatic diamine with two moles of o-cresol and two moles formaldehyde using the Mannich reaction. They can also be produced by reacting a primary aliphatic diamine with two moles of 4-hydroxybenzaldehyde using the Schiff reaction.

Latent epoxy catalytic type hardeners can be generated by reacting N,N(dialkylamino)-3-propylamine with:
 a) a 4-alkylphenol and one mole formaldehyde;
 b) a 2-alkylphenol and one mole formaldehyde;
 c) one mole salicylaldehyde; and
 d) one mole 4-hydroxybenzaldehyde.

Items a) and b) are isomeric, as are c) and d). Items a) and b) are Mannich bases while c) and d) are Schiff bases. The latency property arises from the energy required to open the propyl ligand as well as the bond energy between the two nitrogen atoms.

The first 5 polyols listed in Group B have the fundamental properties listed below (f.w.=formula weight; m.p.=melting point):
 TMP: f.w.=134.18, m.p.=60–62° C.;
 TME: f.w.=120.15, m.p.=200–203° C.;
 NPG: f.w.=104.15, m.p.=123–127° C.;
 DMPA: f.w.=134.13, m.p.=189–191° C.; and
 DMBA: f.w.=148.16, m.p.=109–112° C.

TMP and TME both contain 3 methylol groups. NPG contains 2 methylol groups. DMPA and DMBA each contain one carboxylic acid group and 2 methylol groups.

TMP is the easiest material to work with because of its low melting point. Due to the methylol character of the hydroxyl groups, TMP, TME and NPG are capable of condensing with phenyl ring hydrogen atoms using either acidic or basic catalysts to create adducts with latency properties. TME is highly polar as its high melting point indicates but this is not a practical restriction in aqueous preparations due to its high water solubility. It is a restriction in attempts to form molecular complexes with amines having low boiling points.

However, TMP, TME, NPG, DMPA and DMBA readily form eutectic molecular complexes with imidazole such as Im.TMP, Im.TME, Im.NPG, Im.DMPA, Im.DMBA. The first two of these are crystalline solids of low melting point, approximately 42–55° C. Precise melting point values are difficult to obtain due to weighing errors and the variable water content of the polyols. Im.NPG is a low viscosity, hygroscopic liquid while Im.DMPA and Im.DMBA are both medium viscosity, hygroscopic liquids at ambient temperature.

Im.TMP is not soluble in EPON828. If Im.TMP is powdered and dispersed in EPON828 and the mixture heated, the hardener begins to react with the epoxy at the surface of the solid particles before dissolving, generating an impenetrable surface coating which stops further reaction. However, both Im.TMP and Im.TME are both soluble in a wide variety of materials such as other polyols and liquid amines, for example DEAPA.

Two different approaches are provided herein to solve the problem of poor solubility of the eutectic complex Im.TMP in epoxy. One option is to dissolve Im.TMP in a liquid tertiary amine such as DEAPA or PC/DEAPA which results in epoxy-soluble liquids having different degrees of latency as well as good low-temperature curing characteristics. In the absence of a supplementary tertiary amine, imidazole alone results in very low cure rates at 60–65° C. Another approach is to dissolve imidazole in a polyol such as CGE/2TMP or TMPA (Group B, items 9 and 6, respectively). TMPA is essentially a liquid form of TMP consisting of two polyols of greatly differing molecular weight. The high molecular weight component of this mixture is an excellent Class II hardener/toughener but cures slowly at temperatures of 50° C. or lower due to the high molecular weight. No other polyols or liquid tertiary amines are required to obtain epoxy solubility of these mixtures but may be used optionally depending on the overall curing performance required.

Other Group B liquid polyols are also good solvents for imidazole and may be used instead of or in combination with TMPA. The adduct of cresylglycidylether with two moles TMP (CGE/2TMP) is an excellent solvent for imidazole and cures well at temperatures in the 20–50° C. range. It is also an excellent toughener and results in good cured properties even in undercured systems.

The first three polyols, TMP, TME, and NPG, differ slightly in their curing characteristics with an epoxy resin and in the properties of the cured epoxy. A comparison of the three Class II hardeners Im.TMP.DEAPA, Im.TME.DEAPA and Im.NPG.DEAPA is given in Example II.12, below. The results lend support to the conclusion that only two of the three methylol groups in TMP and TME are reactive with epoxy.

The eutectic complexes Im.DMPA and Im.DMBA are highly latent with EPON828, giving latency periods of 5–7 days. But, they require cure temperatures of about 80–85° C. or higher, depending on which tertiary amine is used. By combining low concentrations of DMPA or DMBA with other less acidic polyols and tertiary amines, hardeners possessing desirable qualities of latency together with rapid curing at relatively low temperatures can be designed.

The development of TMPA resulted from a search for a liquid polyol having relatively high molecular weight and good solvent properties by reacting an excess of TMP with a diepoxide such as EPON828. It was reasoned that such a material should be easier to handle than TMP and the high molecular weight should result in good mechanical properties for a hardened epoxy.

If there was a sufficiently large excess of TMP, there was a possibility that the mixture would not crosslink in the presence of a slow tertiary amine catalyst such as TMG. Accordingly, one part by weight (pbw) EPON828 was combined respectively with 5, 4, 3 and 2 pbw TMP using 1 phr TMG as catalyst. The experiments were carried out in open cups on a hot plate at a temperature of about 100° C.

The weight ratios of 5 and 4 resulted in a mixture of EPON828/2TMP adduct and unreacted TMP which crystallized readily when cooled to room temperature. Theoretically, the weight ratio of TMP to EPON828 is 0.7, assuming complete reaction and an epoxy equivalent weight of 190.

Weight ratios of 3 and 2 resulted in products having a high viscosity at room temperature with little detectable difference between the two. However, the weight ratio 3 product was observed to develop "pin points" of crystallization on standing at room temperature for 24 hours or more. The crystallization disappeared quickly on reheating. The theoretical amount of unreacted TMP was 57% by weight. The weight ratio 2 product appeared to retain all of the unreacted TMP in solution at room temperature, a surprising result given that this product contained 43% unreacted TMP by weight.

The weight ratio 1 product was much more viscous than either of the other two and contained 15% unreacted TMP. Although desirable for the low unreacted portion, the viscosity was found to be excessively high for practical applications. When this product was diluted with additional TMP to a weight ratio of 2, the viscosity was substantially higher than that of the product having an initial weight ratio of 2. This was a clear indication that very high molecular weight oligomers had formed as a result of the reaction between the EPON828/2TMP adduct and additional EPON828.

Based on these experimental results, weight ratios of TMP to EPON828 between 2 and 3 were found to be preferred for practical applications. These weight ratios correspond to molar ratios of TMP per epoxide of approximately between 3 and 4, assuming that the epoxy equivalent weight of EPON828 is 190. These values can be used as a guide for determining the weight ratios of TMP to epoxy when diepoxides other than EPON828 are used. This product is called TMPA (TMP adduct), and is an excellent solvent for amines and imidazole, as well as the dihydric phenols and other polyols. It is also compatible with epoxy resins and cures readily when catalyzed by tertiary amines or imidazole due to the terminal methylol-functional groups and is also latent. It is both a substitute for and an improvement over TMP itself and is a preferred Class II–III polyol.

The high molecular weight polyol in TMPA has a molecular weight of about 600–650 and results in better mechanical properties relative to TMP alone, when cured at temperatures above about 60° C.

However, the adducts of TMP and the diepoxides are tetrafunctional and the internal, secondary hydroxyl groups which do not cure at low temperature due to steric factors will cure if given an elevated temperature postcure so that the ultimate glass transition temperature is not reduced too much.

Because TMPA is an empirically based product and not a chemical compound, a notation had to be devised to specify it, recognizing also that this "material" can be made with many types of diepoxides. The notation TMPA-X(Y) was devised in which "TMPA" means "trimethylolpropane adduct", "X" is the weight ratio of TMP to the diepoxide and "Y" is the name of the diepoxide. For example, the above described preferred materials would be named "TMPA-2 (EPON828)" or "TMPA-3(EPON 828)" or perhaps "TMPA-2.5(EPON828)". For example, diepoxides other than EPON828, such as EPON826 or EPON862 (diglycidylether of bisphenol F), which have lower viscosity than EPON 828, could be used to make TMPA. The notation will change accordingly to reflect the different epoxide. Cycloaliphatic diepoxides such as 4-vinyl-1-cyclohexene diepoxide or 3,4-epoxycyclohexylmethyl-3,4-epoxycyclohexanecarboxylate can also be used. There is also some latitude in selecting the TMP:diepoxide weight ratio so as to control the amount of unreacted TMP in the product.

Liquid polyols result from reacting TMP with 1–2 moles of a monoglycidyl compound such as BGE. The polyol TMP/BGE in combination with DETA for example is a very effective ambient temperature curing hardener. These are also latent polyols and result in strong, flexible cured products when used in Class II hardeners.

Both monohydric phenols and dihydric phenols can be reacted with 1–3 moles of TMP, TME or NPG by ring substitution. Since these are aqueous preparations, TME can be used here. Examples are phenol, p-cresol, o-cresol, and resorcinol. Barium hydroxide octahydrate is a good catalyst and can be easily neutralized with carbon dioxide. In those cases in which the substitution is ortho to a phenolic hydroxyl group, the bulky group prevents the phenolic hydroxyl from reacting with the epoxy. When the mixture contains a tertiary amine, the amine will generally be bonded to the most acidic phenolic hydroxyl. Since this group is not reactive with the epoxy, the amine is prevented from catalyzing the curing reactions and is therefore made latent. Such materials are therefore latency promoters. The amine is released and becomes active at the "activation temperature". The activation temperature is preferably below the cure temperature, so that the cure process causes reaction of the amine.

If an attempt is made to react o-cresylglycidylether with one mole TMP using TMG or other strong base as a catalyst, the initial reaction is between the epoxy and TMP. However, if this product is heated for a prolonged time, the viscosity continues to increase and rapidly reaches an impractical level due to further reaction between the methylol group of TMP and the ring hydrogen atom of o-cresol in the para position, catalyzed by TMG. This secondary reaction can be put to good use by increasing the TMP content to two moles, resulting in a trifunctional polyol of medium viscosity and giving excellent properties when used in any of the Class I, II or III hardeners. Further, it is an excellent solvent for imidazole and dihydric phenols. This product, designated as CGE/2TMP is an excellent toughener for systems which must be cured at temperatures of 50° C. and below. It is particularly useful as a hardener for sub-normal temperature cures, when required.

A polyol with higher molecular weight can be produced by reacting one mole TMP with two moles o-cresylglycidylether which removes both epoxy groups and then reacting this product with two moles TMP, both of which react with o-cresol in the para position. This polyol is tetrafunctional, having two functional methylol groups and two secondary alcohols.

Another high molecular weight polyol can be produced by reacting a diglycidyl compound with two moles of a monohydric phenol capable of ring substitution (such as o-cresol) followed by reacting with two moles TMP.

A more flexible, difunctional polyol can be produced by reacting a monoglycidyl compound (such as BGE but not CGE) with one mole of a monohydric phenol capable of ring substitution (o-cresol) followed by reacting one mole TMP.

A trihydric compound (BHMC) can be formed by reacting a 4-alkylphenol (such as p-cresol) with two moles formaldehyde to produce methylol groups at the 2- and 6-positions. BHMC is an available industrial product. The methylol groups are sufficiently bulky to prevent reaction of the phenolic hydroxyl group with epoxy. When combined with a tertiary amine, the amine bonds preferentially to the phenolic hydroxyl, creating a latent combination which does not cure an epoxy until the temperature rises to the decomposition temperature of the amine-phenol bond at which point the methylol groups react with the epoxy.

Although some of the compounds in the two groups A and B contain more than two hydroxyl groups, not all of these hydroxyl groups are reactive with an epoxy under the curing conditions for the hardener compositions, due to either steric effects or chelation. In general, TMP and TME have only two epoxy-reactive hydroxyls. This conclusion is verified by the fact that the glass transition temperatures obtained using TMP, TME and NPG are very similar, as illustrated by Example II.12, below. Adducts of TMP or TME with a phenyl ring may not have a phenolic hydroxyl capable of reacting with epoxy, depending on the position of the substituent. Also, some of the interior hydroxyl groups in certain polyols can be rendered unreactive by increasing the concentration.

The Amines

The polyamines used in the hardeners are selected from the group consisting of ethylenediamine, diethylenetriamine, triethylenetetramine, tetraethylenepentamine, 1,6-hexamethylenediamine, 2,2,4-trimethyl-1,6-hexamethylenediamine, poly(propyleneglycol)-bis-aminopropylether. A number of other proprietary aliphatic polyamines are also available and these are known to practitioners of the formulation art.

Tertiary amines of the invention include materials having at least one tertiary nitrogen atom and many contain one or more reactive hydrogen atoms in the form of a phenol, secondary alcohol, secondary amine or primary amine. Tertiary amines without an active hydrogen are considered external plasticizers, while those with one or two active hydrogens are generally internal plasticizers. Although imidazole is technically not a tertiary amine it is included here as it performs similarly to a tertiary amine and is a very effective epoxy hardener at temperatures above about 60° C. Although it is not very effective at lower temperatures, it is sometimes useful for its other properties such as a solvent for otherwise epoxy-insoluble materials or as a catalytic hardener for a subsequent, elevated temperature postcure. When so used, it must be supplemented by an additional amine hardener which is effective at the lower temperature.

Description of the Various Hardeners

Mixtures of the previously described polyamine or tertiary amine, group A polyols and group B polyols are generally easily handled, stable liquids which have all of the desirable characteristics previously described, provided some simple rules for determining relative proportions are observed:

a) as a starting point, one molecule of polyamine or tertiary amine should be provided for each phenolic hydroxyl group;

b) no less than one molecule of polyamine or tertiary amine should be provided for each molecule of TMP or mono-substituted TMP; and c) one molecule of amine should be provided for each methylol or secondary hydroxyl group.

Moderate changes in the proportion of polyamine or tertiary amine do not result in major changes in cure rates or properties of the cured epoxy. For Class I hardeners, decreasing the proportion of polyamine may result in incomplete curing. If the concentration of polyamine is reduced below the 70% stoichiometric level, addition of an effective tertiary amine may be required to achieve satisfactory room temperature cures due to the limited capacity of many polyamines to catalyze the epoxy-hydroxyl reactions.

The relative proportions of group A and/or group B polyols in the hardeners influence the cure rate and the mechanical properties of the cured epoxy. In general, the more acidic polyols cure more slowly with a given tertiary amine. The high molecular weight polyols in these groups are preferably used at concentrations of about 4–5 phr in order to achieve significant improvements in strength and toughness. The lower molecular weight polyols can be used as reactive diluents to control mixture viscosity as well as to provide low viscosity mixtures for casting and potting applications when used as the sole polyol component. In general, the higher molecular weight polyols cure more slowly at the same temperatures than those of low molecular weight. Cure rate is also influenced by the nature of the hydroxyl groups. Cure rate decreases in the order; phenolic hydroxyl>methylol>secondary alcohol, provided the polyol/amine mixtures are above their respective activation temperatures.

Determination of the theoretical hardener concentration in the epoxy (phr) for Class I hardeners is a relatively simple procedure. First, the total molecular weight of the hardener complex is determined. Second, the total number of functional groups (n) is added up. Most of the polyols in groups A and B are effectively difunctional, except for compounds A6–A11 which are monofunctional. Third, the total molecular weight is divided by the total number of active hydrogens which is then divided by the epoxy equivalent weight which for EPON828 epoxy is about 190. The result, when multiplied by 100 gives the hardener concentration in phr. As an example, consider BPA.2TMP.4DETA:

$m.w.=228.29+2*134.18+4*103.17=909.33;$ $n=2+2*2+4*5=26;$ and $phr=18.4.$

This value should be considered a theoretical minimum concentration.

Optimum mechanical properties will be obtained when the theoretical minimum is increased by a factor which can range from 1.2 to greater than 2.0. This forces the polyamine to assume a lower functionality than the theoretical value and results in a more flexible structure with greater opportunities for hydrogen bonding. The ultimate glass transition temperature of the cured polymer will also be reduced.

As a general principle, discussed above, the best mechanical properties will be obtained when the glass transition temperature $T_g$ obtained by the selected cure schedule is close to the ultimate glass transition temperature $T_{gu}$. It is generally agreed that the glass transition temperature $T_g$ is limited to about 45° C. above the cure temperature.

The optimum hardener concentration that produces the desired $T_g$ for a given $T_c$ can be determined by testing. The mechanical properties of the cured epoxy are remarkably insensitive to excessive hardener concentrations. In tests where 2½ to 3 times the theoretical hardener concentration was used, unreacted hardener was exuded from the cured epoxy, appearing as a tacky, resinous surface film that was easily removed by wiping with a damp cloth, while the strength and toughness of the cured epoxy were still quite good.

Molecular Complexes

When a polyamine or tertiary amine is mixed with a polyol either under pressure or under reflux conditions, an exothermic reaction occurs with the formation of a molecular complex. The amount of heat released decreases in the order carboxylic acid>phenolic hydroxyl>methylol>secondary alcohol. When the complex is subsequently cured with an epoxy resin, a rapid reaction occurs which involves the decomposition of the complex, mutual catalysis of the reactions between the epoxy and amine and also between the epoxy and the polyol and release of heat as a result of these epoxy reactions. Some of this heat is absorbed by the decomposition of the complex, resulting in a lower overall exotherm and a rapid cure without "runaway exotherm", which can result in foaming, vapor evolution and even charring in conventional epoxy hardener systems.

When the polyol contains more than one type of hydroxyl group, rapid and complete reaction between the epoxy and the polyol can be assured if the most acidic hydroxyl group which forms the strongest intermolecular bond with the amine is placed at the ends of the polyol, thus ensuring that the polyamine or tertiary amine will be located at the same positions. For example, a polyol containing two terminal methylol groups and one or more interior secondary alcohols will react first at the terminal groups and secondarily at the interior hydroxyl groups only if there are available epoxy groups remaining and the structure has not become too rigid at the selected cure temperature. If a sufficiently high concentration of polyol containing internal secondary hydroxyl groups is used, these internal groups will not react with the epoxy.

EXAMPLES

The following examples illustrate the preparation and use of the novel polyols for each class of hardener.

Example I.1

Preparation of TMP/BGE 6.42 g TMP, 6.80 g BGE (epoxy equivalent weight 140) and 0.26 g BDMA (2 pph) were loaded into a 250 ml boiling flask together with a magnetic stir bar and a water condenser was attached. The flask was placed in a heating mantle and the assembly placed on a stir plate. The mantle was heated by means of a variable transformer set at 30%. After heating for 20 min., the temperature was 150° C. The product was a medium amber liquid. The BDMA catalyst remained as part of the product.

Example I.2

Preparation of BPA.2TMP 6.50 g BPA and 8.03 g TMP (5% excess) were placed in a 100 ml beaker with a magnetic stir bar and the beaker was placed on a stirring hot plate at a surface temperature of 150° C. After 15 minutes, BPA was entirely dissolved at a temperature of 127° C. The product was a colorless, medium viscosity liquid which crystallizes slowly over a period of several days if left undisturbed.

Example I.3

Preparation of BPA.2TMP.2DETA

BPA.2TMP produced as above was warmed in a beaker on a stirring hot plate and the theoretical weight of DETA was added slowly with stirring. The product was a nearly colorless, medium-low viscosity liquid having almost no amine odor (warm).

Example I.4

Preparation of ROL/2TMP 5.01 g ROL and 12.22 g TMP were placed in a 250 ml boiling flask together with a magnetic stir bar, a water condenser was attached and the flask was placed in a heating mantle powered by a variable voltage supply. The assembly was placed on a stir plate and heated. A clear solution was obtained after 35 min. when 0.17 g (1 pph) TMG (a strong base) was added. The temperature was 95° C. and the liquid had a greenish tint. After 1 hour and 10 minutes and a maximum temperature of 111° C., the product was a deep blue, resinous liquid. The dried product contains 1 pph TMG.

Example I.5

Preparation of DGEBA/2CAT 3 g EPON828 epoxy and 1.75 g catechol were placed in a 50 ml beaker and placed on a hot plate at a surface temperature of 90–95° C. A clear solution was obtained in 5 minutes. After one hour, 0.5 pph TMG was added and heating continued for 30 minutes more. The product was a colorless, resinous semi-solid.

Example I.6

Test Sample

The following components were mixed in sequence:
1. 5 g EPON828 epoxy
2. 10 phr TMP/BGE
3. 10 phr DETA After curing for 69 days at temperatures ranging from 20°–30° C., the $T_g$ as measured by thermomechanical analysis (TMA) was 72° C. After a 50° C./30 minute postcure, the $T_g$ increased to 78° C.

Example I.7

Test Sample 5 g EPON828 epoxy was mixed with 30 phr BPA.2TMP.2DETA. After curing 2 hours/30° C. followed by 2 days/20° C., the $T_g$ was 60° C. After a 50° C./30 minute postcure, the $T_g$ increased to 79° C. An additional 120° C./10 minute postcure, further increased the $T_g$ to 85° C. It was concluded that the DETA concentration was insufficient to properly catalyze the epoxy-hydroxyl reactions at room temperature.

Example I.8

Test Sample 3.6 g EPON828 epoxy was mixed with 30 phr BPA.2TMP.4DETA. After curing for 30° C./3 hours and 12 days at room temperature, the $T_g$ was 66° C. After a brief exposure to 100° C. in the thermomechanical analyzer, the $T_g$ increased to 93° C. Although the Tg after the initial room temperature cure was about 36–46° C. above the cure temperature, the average functionality of this hardener was still too high since the $T_{gu}$ was considerably above the $T_g$ obtained with the given cure schedule.

Example I.9

Test Sample 40 phr (EPON828 epoxy/2 CAT).2 (TMP/BGE).4DETA was mixed with 5 g EPON828 epoxy and cured at 30° C. for ½ hours followed by 2 days at room temperature. The cured material was very strong and flexible and had a $T_g$ of 69° C.

Example I.10

Test Sample 5 g EPON828 epoxy was mixed with 20 phr BPA.2(TMP/BGE) and 10 phr DETA. The hardener components were blended before addition to the epoxy resin. After curing for 1 hour at 30° C., the mixture had set to a tacky solid, dentable with a spatula. After curing for 71 days at room temperature, the $T_g$ was found to be 75° C. On postcuring at 50° C. for ½ hour, the $T_g$ increased to 83° C. This hardener mixture was used at 120% of the stoichiometric concentration and resulted in a $T_g$ approximately 55° C. above the cure temperature, which is unusual.

Example I.11

Test Sample 5 g EPON828 epoxy was blended with a mixture of 10 phr TMP/BGE and 10 phr DETA. After curing for 1 hour at 30° C., the mixture was a tacky semi-solid. After curing for 71 days at room temperature, the $T_g$ was found to be 72° C. On postcuring at 50° C. for ½ hour, the $T_g$ increased to 78° C. The total hardener concentration was 5% above the stoichiometric value.

Example I.12

Test Sample 5 g EPON828 epoxy was blended with 40 phr of the mixture (DGEBA/2CAT).2(TMP/BGE).4DETA. A straightforward conversion from molar ratios to weight ratios gives 15.4 phr DGEBA/2CAT, 14.0 phr TMP/BGE and 10.6 phr DETA. After heating for 1 hour at 30° C. the mixture was a tacky, dentable solid. After 2 days at room temperature, the $T_g$ was 69° C. The cured sample was strong and tough.

Example I.13

Preparation of CAT/BGE 8.04 g butylglycidylether (epoxy equivalent weight 137) and 6.43 g catechol were loaded into a 250 ml boiling flask equipped with a water condenser and a stir bar. This mixture was heated to 63° C. at which point 1 phr TMG (tetramethylguanidine) was added and heating continued. This was heated to a maximum temperature of 110° C. with stirring over a period of one hour. The product was a dark amber liquid containing 1 phr TMG.

Example I.14

Test Sample

For this hardener, a composition equal to that of Example I.11 was combined with 10 phr 2CGE/3TMP. After curing for 1 hour at 30° C., the mixture was a tacky semi-solid. After 7½ hours at 30° C. the sample was hard and tack-free. After an additional 6 days at room temperature, the $T_g$ was found to be 68° C. After postcuring at 65° C. for 1 hour, the $T_g$ increased to 80° C., which is close to the ultimate value. The Tg after curing at 20–30° C. was therefore within 18% of the ultimate $T_g$. The total hardener concentration was 10% above the stoichiometric value.

Example I.15

Test Sample

This sample contained the same hardener composition as Example I.11 except that 10 phr DETA was replaced by 7.2 phr EDA (ethylenediamine). As with all similar hardener compositions, the hardener mixture was essentially odorless. After processing at the same 30°/20° C. cure schedule as Example I.14, the $T_g$ was found to be 66° C. After postcuring at 65° C. for 1 hour, the $T_g$ increased to 75° C. The cure rate was practically identical to that of Example I.14.

Example I.16

Test Sample 5 g EPON828 epoxy was blended with 27 phr (ROL/2TMP).2TMP.4DETA. The equivalent concentrations by weight were 9.0 phr ROL/2TMP, 7.1 phr TMP and 10.9 phr DETA. After curing for 1 hour at 30° C., the sample was a tacky, dentable solid. After curing for an additional 71 days at room temperature, the $T_g$ was 84° C. This is unusually high if it is assumed that the reactions involve epoxy groups only and it is possible that some reaction between resorcinol and TMP occurred during curing due to ring substitution.

Example I.17

Test Sample 5 g EPON828 epoxy was blended with 28 phr (CAT/BGE).2DETA and cured at 30° C. After 45 minutes, the sample was a tacky semi-solid. After 65 days at room temperature, the $T_g$ was found to be 78° C. The cured sample was strong and tough which appears to be typical of samples containing CAT/BGE despite the small size of this molecule. The hardener concentration was 40% above theoretical.

Example I.18

Test Sample 5 g EPON828 epoxy was blended with a mixture of 5 phr CAT/BGE and 14 phr DETA. The cure rate at 30° C. was about the same as the previous sample. After curing at room temperature for 65 days, the sample was very strong and tough and gave a $T_g$ of 86° C. The hardener concentration was 35% above theoretical.

Example I.19

Preparation of CGE/2TMP

Preparation of this product is complicated by the fact that the industrially available material is 90% pure, the other 10% consisting of the adduct of CGE with o-cresol. The principal product and the impurity both require two moles TMP but the formula weights are different. The results of the calculation show that for a theoretical f.w. of CGE of 164.2 and 90% purity, the weight ratio of TMP to CGE for this reaction is 1.5695. The effective formula weight of CGE for this reaction is therefore 171.0.

CGE and TMP were weighed into a reaction flask fitted with a water condenser, stir bar and electronic thermometer and heated to about 65° C. resulting in a hazy liquid mixture. At this point, 1 phr TMG was added and heating continued over a period of about one hour to a maximum temperature of 150° C. The product was a viscous, pale amber resin. A brief drying period is optional as the amount of water generated is minimal.

Example II.1

Test Sample 5 g EPON828 epoxy was mixed with 10 phr BHM-C.TMG. The mixture remained flexible and tacky for 2 days at room temperature, latency sufficient for film adhesive applications. After curing at 65° C./3 hours, the $T_g$ was 109° C.

Example II.2

Test Sample 5 g EPON828 epoxy was mixed with 13.5 phr (PC/DEAPA).2TMP. The mixture remained flexible and tacky for 5 days at room temperature. The sample was gelled in one hour at 65° C. and cured 1 hour/80° C. giving a $T_g$ of 115° C.

Example II.3

Test Sample 0.7 g BDMA.DELA.TMP was mixed with 1.0 g TMP while warming the mixture on a hot plate. The product was a viscous, colorless liquid at room temperature. This was then mixed with 5 g EPON828 epoxy resin. The mixture was a milky white emulsion of medium viscosity at room temperature. The sample was placed in an oven at 65° C. After ten minutes the sample was clear, colorless and of medium viscosity. After one hour, the sample was a tacky semi-solid. After curing at 65° C. for 3 hours, the $T_g$ was 90° C. The cured material was very strong, tough and colorless. The low $T_g$ appears to be due to the very low functionality of the hardener.

Example II.4

Test Sample 5 g EPON828 epoxy was blended with 10 phr BHM-C.TMG and maintained at room temperature. After 5 days, the sample was a slightly flexible, tacky solid. Upon heating to 65° C., it melted to a viscous liquid and was cured for 2¾ hours at this temperature. The $T_g$ was 109° C.

Example II.5

Test Sample 5 g EPON828 epoxy was blended with 10 phr BHMC.T-MG.TMP and cured 3½ hours at 65° C. The $T_g$ was 99° C. and the sample was very strong and tough.

Example II.6

Test Sample 5 g EPON828 epoxy was blended with a hardener mixture of 20 phr BPA/2BGE and 5 phr MPZ (1-methyl piperazine). After curing 1 hour at 65° C., the $T_g$ was 90° C. A second sample using 20 phr TDP/2BGE instead of BPA/2BGE gave identical results.

Example II.7

Test Sample 5 g EPON828 epoxy was blended with a hardener mixture containing 20 phr CAT/BGE, 5 phr BDMA and 4 phr DELA and left at room temperature. After 4 days, the mixture remained a viscous liquid, exhibiting excellent latency. After heating for 1½ hours at 50° C., the sample remained a very viscous liquid. After curing for 1 hour additional at 65° C., the sample was hard, tack-free, strong and gave a $T_g$ of 98° C.

Example II.8

Preparation of Im.TMG.TMP

The hardener composition Im.TMG.TMP was produced by first heating a mixture of 1 mol. each imidazole (Im) and trimethylolpropane (TMP) until a liquid melt was obtained. The mixture of Im and TMP was a eutectic composition having a relatively low melting point. The mixture was then cooled to about 50° C. and 1 mol. TMG added while stirring until all components were thoroughly mixed. The mixture remained a stable liquid to temperatures as low as 5° C.

Example II.9

Preparation of TMGA 15.58 g of EPON862 (diglycidylether of bisphenol F) and 10.50 g of TMG (0.6% excess) were weighed into a 3-neck, 250 ml flask equipped with a water condenser, stir bar and temperature probe. The mixture was heated to 100° C. over 20 minutes and held at 100° C. for one hour. The resulting product was a viscous resin.

Example II.10

Test Sample

A hardener mixture comprising 8.6 phr 2Im.TMGA.2TMP +2 phr EMI was prepared and blended with 5 g of EPON828 epoxy resin. The sample was cured at 60° C./4 hours and the cured material was hard, strong and tough. The latency period was 24 hours at room temperature.

Example II.11

Test Samples 15 phr of the hardener BHMC.TMG.TMP was blended with 5 g of EPON828 epoxy resin and the sample mixture was cured at 60° C. Examination of the epoxy-hardener mixture showed that the sample was cured after 2 hours. The resulting cured composition was strong and tough. The sample had an observed latency period of 24 hours at room temperature.

A second sample of 10 phr BHMC.TMG.TMP was prepared using EPON828 epoxy resin. The second sample was observed and judged as being fully cured after curing at 60°/4 hours. The latency period of the second sample was observed to be about 48 hours at room temperature.

Example II.12

Comparative Test

The following three samples were prepared to compare the performance of three polyols, TMP, TME and NPG. Hardener concentrations were adjusted to provide the same concentration of imidazole in all three samples: 2.1 phr. The cure schedule was 4 hrs at 60° C. The degree of cure was estimated by DSC (Differential Scanning Calorimetry).

10.5 phr Im.DEAPA.TMP yielded a $T_g$=78.8° C., $T_{gu}$=129.8° C., and was about 75% cured.

9.8 phr Im.DEAPA.TME yielded a $T_g$=81.5° C., $T_{gu}$=131.6° C., and was about 87% cured.

9.3 phr Im.DEAPA.NPG yielded a $T_g$=82.9° C., $T_{gu}$=135.4° C., and was about 78% cured.

Glass transitions correlated inversely with the molecular weight of the polyol, but the differences were small. TME gave the greatest degree of cure at 60° C. The similarity of the glass transition temperatures obtained using these three polyols lends support to the conclusion that TMP and TME are effectively difunctional. However, the degree of cure at 60° C. was inadequate.

Example III.1

Test Sample 5 g EPON828 epoxy was mixed with 3 phr Im.TMG and 5 phr TMP/BGE. The two hardener components were mixed before adding the epoxy. The mixture was gelled after one hour at 75° C. and cured at 120° C./1 hour. The $T_g$ was 153° C. The cured resin was very hard, strong and brittle.

Example III.2

Test Sample 5 g EPON828 epoxy was mixed with (10 phr BPA.2TMP +1.2 phr Im). After heating at 60° C./30 minutes followed by 80° C./30 minutes the sample was a rubbery solid (hot). After curing at 120° C. for 1 hour the $T_g$ was 137° C.

Example III.3

Test Sample 5 g EPON828 epoxy was mixed with (30 phr BPA.2TMP +1.2 phr Im). After heating at 50° C./1 hour followed by 80° C./1 hour, the sample was semi-solid (hot). After curing at 120° C./2 hours the $T_g$ was 86° C.

Example III.4

Test Sample

This sample was designed to have extended latency at room temperature for film adhesive applications with freezer storage and very long "out time" while providing complete curing at 120° C. and good properties of the cured resin. The basic concept was to utilize dicyandiamide (DICY) as the "amine" component of the hardener mixture in the form of a fine suspension in the epoxy resin, in which it is insoluble. DICY normally becomes active only at temperatures above 150° C. An additional hardener component was provided in the form of a mixture of polyols which were unreactive with the epoxy under storage conditions absent soluble DICY and which, when heated to 100–120° C. cause DICY to go into solution, followed by curing reactions of all of the components. It has been found that a mixture of ROL/2TMP and PC/DELA has the desired properties for the polyol solvent component of the hardener and that the correct proportions are: (ROL/2TMP).2(PC/DELA).2DICY.

As previously described, DICY was first milled into the epoxy resin and the polyol mixture, which was a liquid, was then added to the epoxy+DICY mixture at room temperature.

5 g EPON828 epoxy was blended with 5.9 phr DICY (insoluble powder) and a mixture of 12 phr ROL/2 TMP and 15.8 phr PC/DELA was then added. The mixture was an opaque, gray-green slurry. When heated to 107° C. for 15 minutes, there was no change, but when the temperature was increased to 120° C. the mixture abruptly cleared, turned amber and increased rapidly in viscosity. After curing at 120° C. for 1 hour, the $T_g$ was 104° C.

III.5

Test Sample

A small amount of the complex Im.DMPA was prepared by heating a mixture of 1.00 g DMPA and 0.51 g Im at 100° C. for a few minutes until a viscous liquid product was obtained. 6 phr of this mixture was then blended with 5 g EPON828 at room temperature, resulting in a white emulsion. The imidazole concentration was 2.0 phr. The latency period was 7 days at room temperature. The sample was cured at 120° C. in one hour which is typical of imidazole cures without any supplemental tertiary amine.

Reaction Exotherm Characteristics

The three classes of epoxy hardeners described herein are molecular complexes consisting of combinations of amines and polyols as defined above. The polyol molecules are designed so that in most cases the most reactive (most acidic) hydroxyl groups are located at the ends of the molecule. Because of complex formation with amines, the amines are also located at the end points of the polyol molecules. Due to mutual catalysis, this results in rapid reaction of the hardener with the epoxy at lower temperatures than with conventional hardeners and a very rapid buildup of molecular weight of polymer.

The low exotherm characteristics of these epoxy hardeners requires a more detailed explanation. If A is an amine and B is a polyol and A and B are mixed, an exothermic reaction occurs with the formation of a molecular complex:

$$A+B \rightarrow A.B+\Delta H$$

where $\Delta H$ represents the heat released by the reaction.

If the complex A.B is then mixed with an epoxy E, the following sequence of reactions occurs:

$$A.B+E \rightarrow A/E+B/E+\Delta H'-\Delta H$$

where A/E and B/E represent the adducts of the amine-epoxy and polyol-epoxy, respectively, $\Delta H'$ is the heat released by the epoxy reactions, and $\Delta H$ is the heat of formation of the complex A.B. The overall heat released is thus reduced by the heat of formation of the complex A.B.

If, instead of forming the hardener complex A.B first, the polyol B is mixed with the epoxy and the amine A is then added in sequence, the following reactions occur:

$$(B+E)+A \rightarrow A.B+\Delta H+E \rightarrow A/E+B/$$
$$E+\Delta H+\Delta H'-\Delta H \rightarrow A/E+B/E+\Delta H'$$

A comparison of the results for direct addition of the complex to the epoxy versus sequential addition of the hardener components to the epoxy, shows that the difference in heat released for these two cases is $\Delta H$. Sequential addition of the hardener components thus results in a large heat release and a very short pot life or gel time. This is seldom an advantage except where a very fast cure of a small mass of material is desired and the heat released is not conducted away such as would occur in an adhesive joint or a surface coating.

For example, with one hardener system, a pot life of 30 minutes at 30° C. was obtained with a tack-free partial cure in one hour when the complex form of the hardener mixture was used. There was no noticeable exotherm. With sequential addition of the same hardener components, a tack-free partial cure was obtained in 15 minutes at 30° C. due largely to a considerable exotherm, despite the fact that the sample contained only 5 g of epoxy. In certain operations such as press molding where the cure rate is limited by the scorch temperature of the polymer, increased production rates can be obtained by the use of these hardener complexes.

Sequential addition of hardener components containing different polyols can result in unexpected exotherms. For example, ROL/2TMP is considerably more acidic than BPA. If ROL/2TMP is first mixed with the epoxy resin and BPA.2DETA is then added sequentially to the mixture, an exothermic reaction will occur with the formation of (ROL/2TMP).xDETA. As a rule, sequential addition of hardener components must be carefully considered.

Stability of TMP.Amine Complexes

It is generally understood in the chemical arts that trimethylolpropane (TMP) may react chemically with a primary amine in the presence of a catalyst and an elevated temperature. However, there is no information concerning the progress of this reaction at room temperature and in the absence of the catalyst. Since this question is of critical importance to the stability and effectiveness as epoxy hardeners of mixtures of TMP or TMP-derivatives and polyamines, a practical test was designed to answer this question. The test and the results are described below.

A hardener mixture consisting of a 1:1 molar ratio mixture of trimethylolpropane (TMP) and diethylenetriamine (DETA) was prepared. TMP and DETA were weighed into a small beaker and warmed slightly at 50–60° C. on a hot plate until the TMP was completely dissolved. Heat was given off as the TMP dissolved. There was only a barely detectable amine odor of the warm solution. As soon as the mixture had cooled to room temperature, a sample was prepared containing 5 g of Shell EPON828 epoxy and 21 phr of the hardener mixture. The sample was placed in an air-circulating oven at 30° C. and the physical properties of the sample recorded at 30 minute intervals as curing progressed. The remainder of the hardener sample was placed in a glass vial, tightly stoppered and stored at room temperature.

After 293 days at room temperature, the hardener sample was retrieved and a second epoxy sample was prepared which was identical to the first and cured under the same conditions. The results of the cure test were identical. It can be concluded that no substantial chemical change occurred in the hardener sample during the intervening period of storage at room temperature and most importantly, that there was no loss of effectiveness of the hardener mixture as a result of the prolonged storage at room temperature.

Hardener Compositions

A particularly useful Class II hardener composition uses TMG as one of the amine components. A hardener comprised of imidazole, TMG and TMP in molar ratios from 2:1:1 to 1:2:1, such as described in Example II.8, above, has extremely long latency, with a cure temperature of about 65° C. This hardener will cure an epoxy in about 4 hours. An epoxy hardener of this type is particularly useful in the aircraft production industry, where long latency periods are necessary so that workers have sufficient time to bond complex assemblies before curing.

The Im.TMG.TMP hardener is a Class II hardener and a triple complex. Preferably, the hardener is made using a molar ratio of 1:1:1, but other ratios within the described range are acceptable. Variations of the molar ratio will affect the cure rate and/or latency period, and can be adjusted to suit a particular need.

Accelerators, such as catalytic hardeners identified in group A as items A6, A7, A8, A9, A10 and A11, can be added to the hardener to increase the cure rate. Also, any of the group A or B phenolic compounds can be used as co-curatives.

The cure rate can also be increased by adding a latent catalytic hardener such as 2-ethyl-4-methylimidazole (EMI). EMI is an example of a blocked imidazole which is quite latent at low concentrations and is an effective cure accelerator at 60° C. or higher. EMI is simply added to the Im.TMG.TMP hardener prior to combination with an epoxy. The concentration of the hardener used in the selected epoxy will necessarily vary according to the desired cure and latency characteristics.

It has been found during testing of the Im.TMG.TMP hardener system that small amounts of TMG can be lost from the epoxy-hardener mixture by evaporation during the initial stages of curing at 60° C. The evaporation of TMG can present a hazard to persons who use the hardener in other than laboratory conditions, and, as well, results in a change in the molar ratio of the components.

Methods for preventing evaporation were investigated, including reacting TMG with a monoepoxide or a diepoxide, or reacting TMG with a phenol or dihydric phenol and formaldehyde to increase the molecular weight, while retaining at least one of the desired functional groups.

A preferred solution for reducing the volatility of TMG while providing the same desired function is to react 2 moles of TMG with a diglycidylether to produce a secondary diol with pendant TMG groups. The resulting compound is referred to herein as TMGA, or TMG Adduct. In particular, the diglycidylether of bisphenol F (commercially available as Shell EPON862) produces TMGA having the lowest. observed viscosity; see Example II.9.

When TMGA is substituted for TMG in the Im.T-MG.TMP hardener, the preferred hardener formula becomes 2Im.TMGA.2TMP, since TMGA has two TMG groups. The same range of molar ratios of imidazole, TMGA and trim-ethylolpropane can be used as with the TMG formulation. The TMGA formulation of this hardener eliminates the observed vapor problem of the TMG formulation, cures an epoxy at about 60° C. and has a slightly longer latency than the TMG formulation. The hardener using TMGA, however, provides improved mechanical properties to the resulting cured epoxy composition compared to the TMG hardener.

A preferred hardener having the formula BHMC.T-MG.TMP has good latency, cures at 60° C. and as explained further below, reduces the problem of evaporation of the TMG during curing as well. Although TMG is ordinarily considered a sluggish hardener (see, e.g., A. E. Sherr et al., Journal of Applied Polymer Science, 9:2707 (1965)), the BHMC has been uexpectedly observed by the inventor to effectively act as both an accelerator and latency promoter. The complex of BHMC.TMG is an extremely viscous material, believed to result from a high degree of head-to-tail hydrogen bonding between the nitrogen atoms and methylol hydroxyl groups.

In mixtures with epoxy resin, the BHMC.TMG complex alone results in conversion of the mixture to a hard, tacky material (the "A stage") in about 3–4 days at room temperature. But, upon heating to a cure temperature of between 60–65° C., the A stage material melts to a viscous liquid and undergoes a normal cure. The false vitrification is detrimental to the use of BHMC.TMG hardener mixed with epoxy as a film adhesive or composite matrix resin due to the disappearance of desirable tack and flex properties.

However, the addition of one mole TMP to the BHM-C.TMG remedies this problem. The TMP serves as a hydrogen bonded end-capper and reduces the viscosity of both the BHMC.TMG.TMP hardener and the epoxy-hardener mixture to manageable levels. Although the addition of TMP reduces the potential latency of the hardener, latency is still excellent and exceeds that of the 2Im.TMGA.2TMP hardener. The BHMC.TMG.TMP hardener cures easily at 60–65° C. and provides excellent mechanical properties to the cured epoxy. And, despite unreacted TMG being present in the hardener mixture, the combination with a phenol (BHMC) results in a low TMG vapor pressure so that evaporation of TMG during use of the hardener was not observed.

The adduct of catechol with one mole of a monoepoxide (CAT/BGE) results in a preferred polyol which, when combined with a polyamine (Class I hardener) results in rapid, low temperature curing and good cured properties and, when combined with a tertiary amine, results in a Class II hardener having good latency and good cured properties.

The adduct of cresylglycidylether with 2 moles TMP (CGE/2TMP) results in a preferred polyol which is an excellent solvent for imidazole and which can cure an epoxy at temperatures as low as 20° C., either in combination with a polyamine or with a tertiary amine resulting in cured materials having excellent strength and toughness. This is an exception to the classification of hardeners into Class I and Class II temperature ranges.

The adduct of a diepoxide with an excess of TMP, referred to as TMPA is a preferred polyol when used as a Class II or III hardener component which is an excellent solvent for imidazole and results in cured epoxies having excellent strength and toughness.

What is claimed is:

1. A method of designing a hardener for an epoxy resin to produce a hardened epoxy resin having good mechanical and thermal properties by curing under pre-determined cure temperature and time conditions, the method comprising the steps of:
   a) selecting a component from the group consisting of a mixture of polyamines and tertiary amines, imidazole, and dicyandiamide;
   b) selecting a polyol mixture comprising a first polyol having phenolic hydroxy groups, secondary hydroxy groups, and combinations thereof, and a second polyol having methylol functional groups, secondary hydroxy groups and combinations thereof, or only the combination of methylol functional groups and secondary hydroxy groups;
   c) forming the hardener by combining the component and the polyol;
   d) combining the hardener with the epoxy resin to form an epoxy-hardener system;
   e) curing the epoxy-hardener system at a pre-determined cure temperature and time;
   f) determining whether a glass transition temperature of the epoxy-hardener system is approximately equal to the pre-determined cure temperature plus 45° C. as represented by the equation $T_g \approx T_c + 45°$ C.;
   g) determining whether the ultimate glass transition temperature is approximately equal to the glass transition temperature as represented by the equation $T_{gu} \approx T_g$; and
   h) accepting the hardener if the equations in both steps f and g) are satisfied, or otherwise reformulating the hardener until both steps f) and g) are satisfied.

2. The method of claim 1, further comprising adjusting the composition of the hardener it the ultimate glass transition temperature is more than about 55° C. above the pre-determined cure temperature, or the ultimate glass transition temperature is greater than 1.2 times the glass transition temperature.

3. The method according to claim 2, wherein adjusting the composition of the hardener comprises one of reducing the functionality of the component, reducing the concentration of the component, reducing the functionality of the polyol, increasing the flexibility of the polyol, increasing the concentration of the polyol and combinations thereof.

4. The method according to claim 1, further comprising adjusting the composition of the hardener if the glass transition temperature is less than about 35° C. above the cure temperature.

5. The method according to claim 4, wherein adjusting the composition of the hardener comprises selecting a different one of the components, increasing the concentration of the selected component, reducing the acidity of the polyol, increasing the concentration of the polyol, and combinations thereof.

* * * * *